(12) United States Patent
Da Silva et al.

(10) Patent No.: US 12,634,717 B2
(45) Date of Patent: May 19, 2026

(54) L1/L2-CENTRIC MOBILITY—NEIGHBOUR CELL MEASUREMENTS

(71) Applicant: Telefonaktiebolaget LM Ericsson (publ), Stockholm (SE)

(72) Inventors: Icaro Leonardo Da Silva, Solna (SE); Pradeepa Ramachandra, Linköping (SE); Helka-Liina Määttänen, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 476 days.

(21) Appl. No.: 18/248,402

(22) PCT Filed: Oct. 22, 2021

(86) PCT No.: PCT/IB2021/059780
§ 371 (c)(1),
(2) Date: Apr. 10, 2023

(87) PCT Pub. No.: WO2022/084955
PCT Pub. Date: Apr. 28, 2022

(65) Prior Publication Data
US 2024/0022925 A1     Jan. 18, 2024

Related U.S. Application Data

(60) Provisional application No. 63/104,404, filed on Oct. 22, 2020.

(51) Int. Cl.
*H04W 24/02*     (2009.01)
*H04W 24/10*     (2009.01)

(52) U.S. Cl.
CPC ........... *H04W 24/02* (2013.01); *H04W 24/10* (2013.01)

(58) Field of Classification Search
CPC . H04W 24/02; H04W 24/10; H04W 36/0055; H04W 48/16
See application file for complete search history.

(56) References Cited

U.S. PATENT DOCUMENTS

| | | | |
|---|---|---|---|
| 2010/0197298 A1* | 8/2010 | So | H04W 24/10 |
| | | | 455/424 |
| 2012/0327797 A1 | 12/2012 | Siomina et al. | |

(Continued)

FOREIGN PATENT DOCUMENTS

| | | |
|---|---|---|
| WO | 2013/028119 A1 | 2/2013 |
| WO | 2019/196098 A1 | 10/2019 |
| WO | 2019/241969 A1 | 12/2019 |

OTHER PUBLICATIONS

International Search Report and Written Opinion dated Feb. 2, 2022 issued in PCT Application No. PCT/IB2021/059780 filed Oct. 22, 2021, consisting of 15 pages.

(Continued)

*Primary Examiner* — Chuong A Ngo
(74) *Attorney, Agent, or Firm* — Weisberg I.P. Law, P.A.

(57)     ABSTRACT

A method, system and apparatus are disclosed for L1/L2—centric mobility—neighbor cell measurements. In one embodiment, a method implemented in a wireless device, WD, includes receiving a measurement configuration to perform at least one neighbor cell measurement, the measurement configuration indicating a first group of PCIs; performing the at least one neighbor cell measurement based on the measurement configuration, for the first group of PCIs; and triggering an event based on the at least one neighbor cell measurement for the first group of PCIs. In one embodiment, a method implemented in a network node includes transmitting a measurement configuration indicating a first group of PCIs; and receiving a report as a result (Continued)

of an event that is triggered based on the at least one neighbor cell measurement for the first group of PCIs.

24 Claims, 14 Drawing Sheets

(56)                    References Cited

U.S. PATENT DOCUMENTS

| | | |
|---|---|---|
| 2013/0077513 A1 | 3/2013 | Ng et al. |
| 2021/0153046 A1 | 5/2021 | Xu et al. |

OTHER PUBLICATIONS

3GPP TSG RAN Meeting #86; RP-193133; Source: Samsung; Title: New WID: Further Enhancements on MIMO for NR; Document for: Approval; Agenda Item: 9.1.1; Sitges, Spain Dec. 9-12, 2019, consisting of 5 pages.

3GPP TS 38.300 V16.2.0 (Jul. 2020) 3rd Generation Partnership Project; Technical Specification Group Radio Access Network; NR; NR and NG-RAN Overall Description; Stage 2 (Release 16), consisting of 148 pages.

3GPP TS 38.331 V16.2.0 (Sep. 2020) 3rd Generation Partnership Project; Technical Specification Group Radio Access Network; NR; Radio Resource Control (RRC) Protocol Specification (Release 16), consisting of 921 pages.

3GPP TS 38.133 V16.4.0 (Jun. 2020) 3rd Generation Partnership Project; Technical Specification Group Radio Access Network; NR; Requirements for support of radio resource management (Release 16), consisting of 1463 pages.

3GPP TS 38.211 V16.2.0 (Jun. 2020) 3rd Generation Partnership Project; Technical Specification Group Radio Access Network; NR; Physical channels and modulation (Release 16), consisting of 131 pages.

3GPP TS 38.212 V16.2.0 (Jun. 2020) 3rd Generation Partnership Project; Technical Specification Group Radio Access Network; NR; Multiplexing and channel coding (Release 16), consisting of 151 pages.

3GPP TS 38.215 V16.2.0 (Jun. 2020) 3rd Generation Partnership Project; Technical Specification Group Radio Access Network; NR; Physical layer measurements (Release 16), consisting of 25 pages.

3GPP TS 38.321 V16.1.0 (Jul. 2020) 3rd Generation Partnership Project; Technical Specification Group Radio Access Network; NR; Medium Access Control (MAC) protocol specification (Release 16), consisting of 151 pages.

* cited by examiner

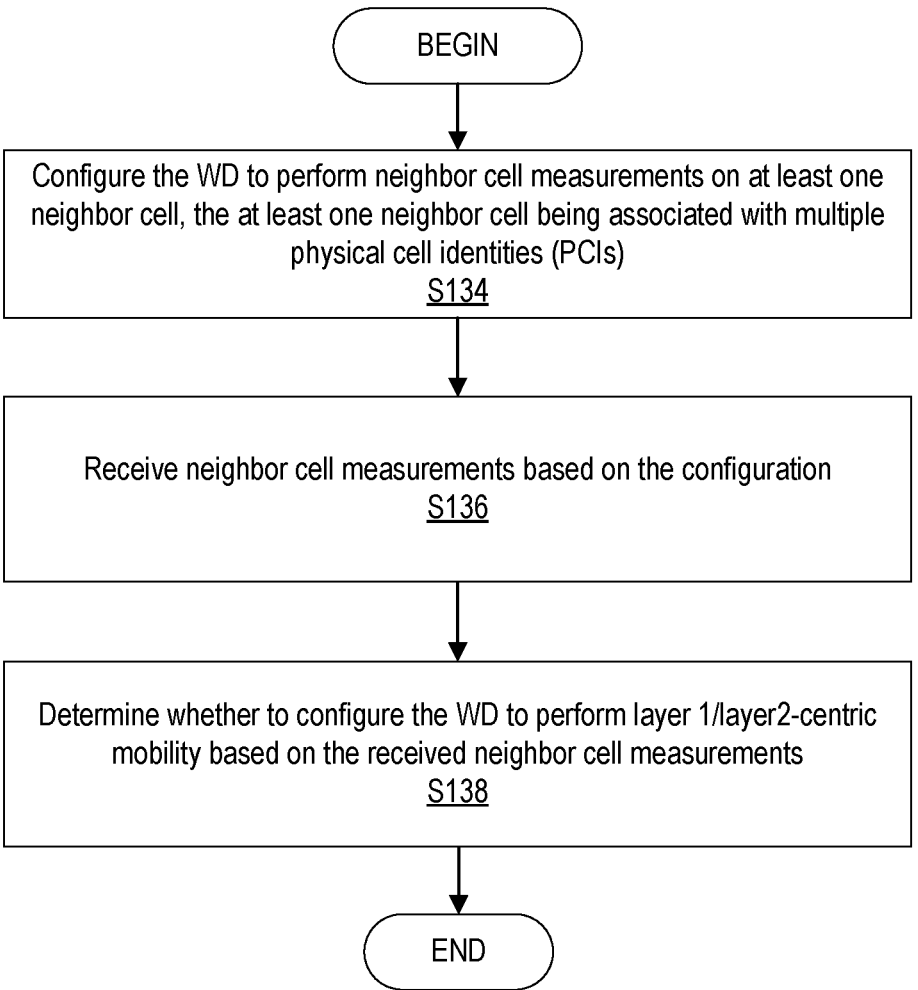

BEGIN

Configure the WD to perform neighbor cell measurements on at least one neighbor cell, the at least one neighbor cell being associated with multiple physical cell identities (PCIs)
S134

Receive neighbor cell measurements based on the configuration
S136

Determine whether to configure the WD to perform layer 1/layer2-centric mobility based on the received neighbor cell measurements
S138

END

FIG. 9

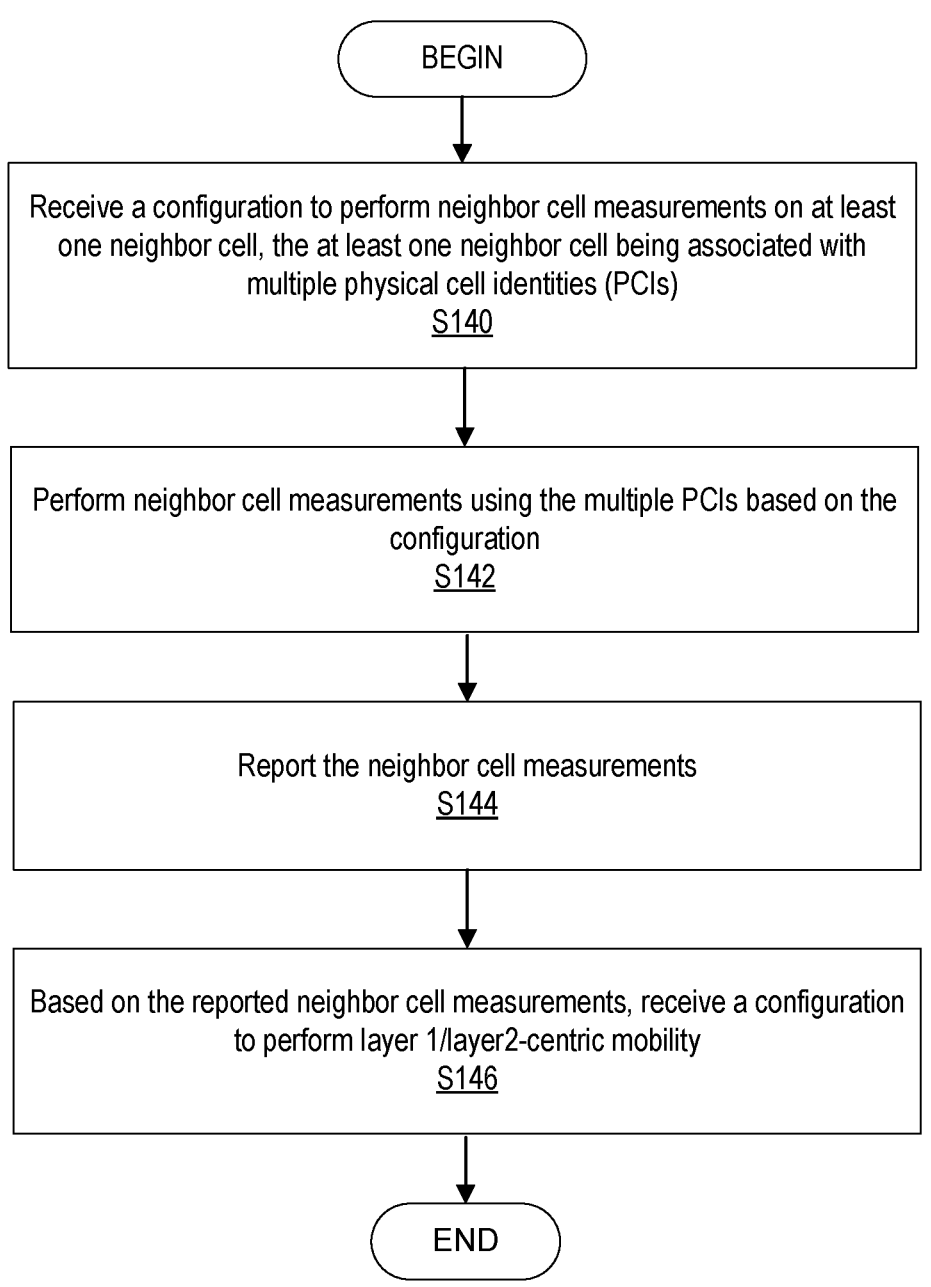

BEGIN

Receive a configuration to perform neighbor cell measurements on at least one neighbor cell, the at least one neighbor cell being associated with multiple physical cell identities (PCIs)
S140

Perform neighbor cell measurements using the multiple PCIs based on the configuration
S142

Report the neighbor cell measurements
S144

Based on the reported neighbor cell measurements, receive a configuration to perform layer 1/layer2-centric mobility
S146

END

FIG. 10

L1/L2-CENTRIC MOBILITY—NEIGHBOUR CELL MEASUREMENTS

CROSS-REFERENCE TO RELATED APPLICATIONS

This application is a Submission Under 35 U.S.C. § 371 for U.S. National Stage Patent Application of International Application No.: PCT/IB2021/059780, filed Oct. 22, 2021 entitled "L1/L2-CENTRIC MOBILITY-NEIGHBOUR CELL MEASUREMENTS," which claims priority to U. S. Provisional Application No.: 63/104404, filed Oct. 22, 2020, entitled "L1/L2-CENTRIC MOBILITY-NEIGHBOR CELL MEASUREMENTS," the entireties of both of which are incorporated herein by reference.

RELATED APPLICATION

This patent application claims the benefit of priority to U.S. Provisional Patent Application No. 63/104,404, titled "L1/L2-CENTRIC MOBILITY—NEIGHBOUR CELL MEASUREMENTS," filed on Oct. 22, 2020.

FIELD

The present disclosure relates to wireless communications, and in particular, to Open Systems Interconnection (OSI) Model Layer 1/Layer 2 (L1/L2)—centric mobility—neighbor cell measurements.

BACKGROUND

Measurement Model in 3rd Generation Partnership Project (3GPP) New Radio (NR, also called 5th Generation or 5G)

The following is the excerpt from 3GPP Technical Specification (TS) 38.300 Version (V) 16.2.0 (2020-07) that details the measurement model (how the cell level and beam level open systems interconnection (OSI) layer 3 (L3) measurements are derived) in NR.

In RRC_CONNECTED, the wireless device (WD, also called user equipment or UE) measures multiple beams (at least one) of a cell and the measurements results (power values) are averaged to derive the cell quality. In doing so, the WD is configured to consider a subset of the detected beams. Filtering takes place at two different levels: at the physical layer to derive beam quality and then at the radio resource control (RRC) level to derive cell quality from multiple beams. Cell quality from beam measurements is derived in the same way for the serving cell(s) and for the non-serving cell(s). Measurement reports may contain the measurement results of the X best beams if the WD is configured to do so by the network node (e.g., gNB).

An example corresponding high-level measurement model is illustrated in FIG. 1.

NOTE: K beams correspond to the measurements on synchronization signal block (SSB) or channel state information reference signal (CSI-RS) resources configured for L3 mobility by network node (e.g., gNB) and detected by WD at layer 1 (L1).

A: measurements (beam specific samples) internal to the physical layer.

Layer 1 filtering: internal layer 1 filtering of the inputs measured at point A. Exact filtering is implementation dependent. How the measurements are actually executed in the physical layer by an implementation (inputs A and Layer 1 filtering) in not constrained by the standard.

$A^1$: measurements (i.e., beam specific measurements) reported by layer 1 to layer 3 after layer 1 filtering.

Beam Consolidation/Selection: beam specific measurements are consolidated to derive cell quality. The behaviour of the Beam consolidation/selection is standardised and the configuration of this module is provided by RRC signalling. Reporting period at B equals one measurement period at $A^1$.

B: a measurement (i.e., cell quality) derived from beam-specific measurements reported to layer 3 after beam consolidation/selection.

Layer 3 filtering for cell quality: filtering performed on the measurements provided at point B. The behaviour of the Layer 3 filters is standardised and the configuration of the layer 3 filters is provided by RRC signalling. Filtering reporting period at C equals one measurement period at B.

C: a measurement after processing in the layer 3 filter. The reporting rate is identical to the reporting rate at point B. This measurement is used as input for one or more evaluation of reporting criteria.

Evaluation of reporting criteria: checks whether actual measurement reporting is necessary at point D. The evaluation can be based on more than one flow of measurements at reference point C, e.g., to compare between different measurements. This is illustrated by input C and $C^1$. The WD may evaluate the reporting criteria at least every time a new measurement result is reported at point C, $C^1$. The reporting criteria are standardised and the configuration is provided by RRC signalling (WD measurements).

D: measurement report information (message) sent on the radio interface.

L3 Beam filtering: filtering performed on the measurements (i.e., beam specific measurements) provided at point $A^1$. The behaviour of the beam filters is standardised and the configuration of the beam filters is provided by RRC signalling. Filtering reporting period at E equals one measurement period at $A^1$.

E: a measurement (i.e., beam-specific measurement) after processing in the beam filter. The reporting rate is identical to the reporting rate at point $A^1$. This measurement is used as input for selecting the X measurements to be reported.

Beam Selection for beam reporting: selects the X measurements from the measurements provided at point E. The behaviour of the beam selection is standardised and the configuration of this module is provided by RRC signalling.

F: beam measurement information included in measurement report (sent) on the radio interface.

Layer 1 filtering introduces a certain level of measurement averaging. How and when the WD exactly performs the required measurements is implementation specific to the point that the output at B fulfils the performance requirements set in 3GPP TS 38.133. Layer 3 filtering for cell quality and related parameters used are specified in 3GPP TS 38.331 and do not introduce any delay in the sample availability between B and C. Measurement at point C, C1 is the input used in the event evaluation. L3 Beam filtering and related parameters used are specified in 3GPP TS 38.331 and do not introduce any delay in the sample availability between E and F.

Intra-frequency neighbour (cell) measurements and inter-frequency neighbour (cell) measurements are defined as follows:

a measurement is defined as an SSB based intra-frequency measurement provided that the center frequency of the SSB of the serving cell and the center frequency of the SSB of the neighbour cell are the same, and the subcarrier spacing of the two SSBs is also the same.

a measurement is defined as an SSB based inter-frequency measurement provided that the center frequency of the SSB of the serving cell and the center frequency of the SSB of the neighbour cell are different, or the subcarrier spacing of the two SSBs is different.

NOTE: For SSB based measurements, one measurement object corresponds to one SSB and the WD considers different SSBs as different cells.

a measurement is defined as a CSI-RS based intra-frequency measurement provided that the bandwidth of the CSI-RS resource on the neighbour cell configured for measurement is within the bandwidth of the CSI-RS resource on the serving cell configured for measurement, and the subcarrier spacing of the two CSI-RS resources is the same.

a measurement is defined as a CSI-RS based inter-frequency measurement provided that the bandwidth of the CSI-RS resource on the neighbour cell configured for measurement is not within the bandwidth of the CSI-RS resource on the serving cell configured for measurement, or the subcarrier spacing of the two CSI-RS resources is different. 3GPP TS 38.331 v16.2.0 (2020-07) details the measurement model related parameters' configurations in the measurement object (e.g., associated to an event and a measurement identifier being configured).

Types of Neighbour Cells for Measurements in NR

The measurement procedures distinguish the following types of cells:

The NR serving cell(s)—these are the Special Cell (Sp-Cell) and one or more Secondary Cells (SCell)s.

Listed cells—these are cells listed within the measurement object(s).

Detected cells—these are cells that are not listed within the measurement object(s) but are detected by the WD on the SSB frequency(ies) and subcarrier spacing(s) indicated by the measurement object(s).

For this present disclosure, the NR detected cells and listed cells (which may be called neighbour cells, or non-serving cells) may be considered particularly relevant.

Listed Cells

As defined above, NR listed cells are the cells listed within the measurement object(s), as provided by 3GPP TS 38.331 v16.2.0 (2020-07) in the MeasObjectNR information element (IE).

There are three kinds of listed cells:

1) Cells with cell-specific offsets—configured within cellsToAddModList, they are used for event-triggered measurement reporting. Each element in the list contains a cell, indicated by a physical cell identity (PCI, field physCellId of IE PhysCellId) and cell-specific offsets for entering leaving conditions of events like A1-A6 (field cellIndividualOffset of IE Q-OffsetRangeList).

2) White-listed cells—within a measurement object, whitelisted cells are the only ones applicable in event evaluation or measurement reporting. These are configured as a sequence of IEs PCI-RangeElement, as shown below:

PCI-RangeElement

The IE PCI-RangeElement is used to define a PCI-Range as part of a list (e.g., AddMod list).

PCI-RangeElement information element

```
-- ASN1START
-- TAG-PCI-RANGEELEMENT-START
PCI-RangeElement ::=            SEQUENCE {
    pci-RangeIndex            PCI-Range
    pci-Range                 PCI-Range
}
-- TAG-PCI-RANGEELEMENT-STOP
-- ASN1STOP
```

PCI-RangeIndex

The IE PCI-RangeIndex identifies a physical cell id range, which may be used for different purposes.

3) Black-listed cells—Blacklisted cells are not applicable in event evaluation or measurement reporting.

Associated with it, is the concept of an applicable cells, i.e., the cells to be considered in event evaluation. The white listed cells are the only ones considered to be applicable for a given frequency in the measurement object, as provided in 3GPP TS 38.331 v16.2.0 (2020-07)

Detected Cells

As defined above, NR detected cells are the cells not listed within the measurement object(s) but are detected by the WD on the SSB frequency(ies) and subcarrier spacing(s) indicated by the measurement object(s). In a normal case (i.e., in a network that is properly configured, without PCI collision), each detected cell in a given frequency (associated with a measurement object) has a unique PCI in that frequency.

In that sense, a detected cell is a cell in the configured frequency (i.e., configured measurement object—MO) with a given PCI associated to the detected SSBs (PCI being derived by detecting the synchronization sequences primary synchronization signal (PSS) and secondary synchronization signal (SSS), as defined in TS 38.211). Section 5.5.3 of 3GPP TS 38.331 v16.2.0 provides details for performing measurements.

Usage of PCI for Neighbour Cell Measurements

The PCIs are encoded in the PSS and SSS as part of the synchronization signal/physical broadcast channel (SS/PBCH Block, also referred to as SSB), as defined in 3GPP TS 38.212. Then, measurements per SSB and CSI-RS for a given PCI are provided in more details in TS 38.215, such as the following SSB-based measurements:

SS reference signal received power (SS-RSRP);

SS reference signal received quality (SS-RSRQ);

SS reference signal received quality (SS-SINR); and

SS reference signal received power (SS-RSRP), for example, is defined as the linear average over the power contributions of the resource elements that carry secondary synchronization signals. SS-RSRP may be measured only among the reference signals corresponding to SS/PBCH blocks with the same SS/PBCH block index and the same physical-layer cell identity. If SS-RSRP is not used for L1-RSRP and higher-layers indicate certain SS/PBCH blocks for performing SS-RSRP measurements, then SS-RSRP is measured only from the indicated set of SS/PBCH block(s).

SS-RSRQ is defined as the ratio of NxSS-RSRP/NR carrier Received Signal Strength Indicator (RSSI), where N is the number of resource blocks in the NR carrier RSSI measurement bandwidth. The measurements in the numerator and denominator may be made over the same set of resource blocks. In other words, as SS-RSRQ is computed based on SS-RSRP, it may also be measured only among the reference signals corresponding to SS/PBCH blocks with the same SS/PBCH block index and the same physical-layer cell identity.

SS-SINR is defined as the linear average over the power contribution of the resource elements carrying secondary synchronization signals divided by the linear average of the noise and interference power contribution. If SS-SINR is not used for L1-SINR and higher-layers indicate certain SS/PBCH blocks for performing SS-SINR measurements, then SS-SINR is measured only from the indicated set of SS/PBCH block(s).

The NR measurement model has been described above. Therein, it was described that WD in RRC_CONNECTED measures multiple beams (at least one) of a cell and the measurements results (power values) are averaged to derive the cell quality. What is called a measurement of a "beam" there can be interpreted as measurements of an SSB, performed for SSBs with the same PCI and the same SSB index. As stated in 3GPP TS 38.300, an SSB includes PSS and SSS, each occupying 1 symbol and 127 subcarriers, and PBCH spanning across 3 orthogonal frequency division multiplexing (OFDM) symbols and 240 subcarriers, but on one symbol leaving an unused part in the middle for SSS as show below. The possible time locations of SSBs within a half-frame are determined by sub-carrier spacing and the periodicity of the half-frames where SSBs are transmitted is configured by the network. During a half-frame, different SSBs may be transmitted in different spatial directions (i.e., using different beams, spanning the coverage area of a cell).

When an SSB is associated with a remaining minimum system information (RMSI), the SSB corresponds to an individual cell, which has a unique NR global cell identifier (NCGI). Such an SSB is referred to as a Cell-Defining SSB (CD-SSB). A primary cell (PCell) is always associated to a CD-SSB located on the synchronization raster. FIG. 2 illustrates an example arrangement for SSs.

Cell Quality Derivation (CQD) of Neighbour Cells in RRC and its Usage

An NR in RRC_CONNECTED is configured to perform neighbour cell measurements for event-triggered measurement reporting, e.g., when the WD is configured with any of the following events:

Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2;

Event A6: Neighbour becomes amount of offset better than SCell.

A RRC procedure for neighbour cell measurements has been defined for that. The purpose is to enable the network to configure the WD with measurement events (e.g., A3) wherein neighbour cell quality (e.g., RSRP, RSRQ, SINR) is compared with an absolute threshold and/or with the quality of a serving cell (for possibly triggering an inter-frequency/intra-frequency handover—called in NR an MCG reconfiguration with sync). The procedure is defined in 3GPP TS 38.331.

Arrangements to improve neighbor cell measurements for L1/L2—centric mobility are needed.

SUMMARY

Some embodiments advantageously provide methods, systems, and apparatuses for L1/L2)—centric mobility—neighbor cell measurements.

In one embodiment, a network node is configured to configure a WD to perform neighbor cell measurements on at least one neighbor cell, the at least one neighbor cell being associated with multiple PCIs; receive neighbor cell measurements based on the configuration; and determine whether to configure the WD to perform layer 1/layer2-centric mobility based on the received neighbor cell measurements.

In one embodiment, a wireless device (WD) is configured to receive a configuration to perform neighbor cell measurements on at least one neighbor cell, the at least one neighbor cell being associated with multiple physical cell identities (PCIs); perform neighbor cell measurements using the multiple PCIs based on the configuration; report the neighbor cell measurements; and based on the reported neighbor cell measurements, receive a configuration to perform layer 1/layer2-centric mobility.

According to an aspect, a method implemented in a network node configured to communicate with a wireless device, WD, is provided. The method comprises transmitting a measurement configuration to the WD to perform at least one neighbor cell measurement, the measurement configuration indicating a first group of PCIs; and receiving a report from the WD, as a result of an event that is triggered based on the at least one neighbor cell measurement for the first group of PCIs. In some embodiments of this aspect, the WD is configured with multiple Physical Cell Identities, PCIs, the multiple PCIs being configured for a mobility procedure, and the WD is configured with one or more cells operating in a same serving frequency, each cell associated with one or more PCIs According to an aspect, a method implemented in a wireless device, WD, is provided. The method comprises receiving a measurement configuration to perform at least one neighbor cell measurement, the measurement configuration indicating a first group of PCIs; performing the at least one neighbor cell measurement based on the measurement configuration, for the first group of PCIs; and triggering an event based on the at least one neighbor cell measurement. In some embodiments, the WD is configured with multiple Physical Cell Identities, PCIs, the multiple PCIs being configured for a mobility procedure, and the WD is configured with one or more cells operating in a same serving frequency, each cell associated with one or more PCIs.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is a flowchart of an exemplary process in a network node according to some embodiments of the present disclosure;

FIG. 10 is a flowchart of an exemplary process in a wireless device according to some embodiments of the present disclosure;

DETAILED DESCRIPTION

In 3GPP Release 17 (Rel-17), 3GPP is going to standardize L1/L2 centric inter-cell mobility (or L1-mobility, inter-PCI TCI state change/update/modification, etc.). This is justified in the Work Item Description (WID) RP-193133 (Further enhancements on multiple-input multiple-output (MIMO) for NR) by the fact that, while 3GPP Rel-16 manages to offer some reduction in overhead and/or latency, high-speed vehicular scenarios (e.g., a WD traveling at high speed on highways) at frequency 2 (FR2) require more aggressive reduction in latency and overhead—not only for intra-cell, but also for L1/L2 centric inter-cell mobility. That may be explained by the following:

Enhancement on multi-beam operation, mainly targeting FR2 while also applicable to frequency 1 (FR1):

a) Identify and specify features to facilitate more efficient (lower latency and overhead) DL/UL beam management to support higher intra- and L1/L2-centric inter-cell mobility and/or a larger number of configured transmission configuration indication (TCI) states:

i) Common beam for data and control transmission/reception for downlink (DL) and uplink (UL), especially for intra-band carrier aggregation (CA)

ii) Unified TCI framework for DL and UL beam indication iii) Enhancement on signaling mechanisms for the above features to improve latency and efficiency with more usage of dynamic control signaling (as opposed to radio resource control (RRC))

b) Identify and specify features to facilitate UL beam selection for WDs equipped with multiple panels, considering UL coverage loss mitigation due to maximum permissible exposure (MPE), based on UL beam indication with the unified TCI framework for UL fast panel selection.

Figure 1:
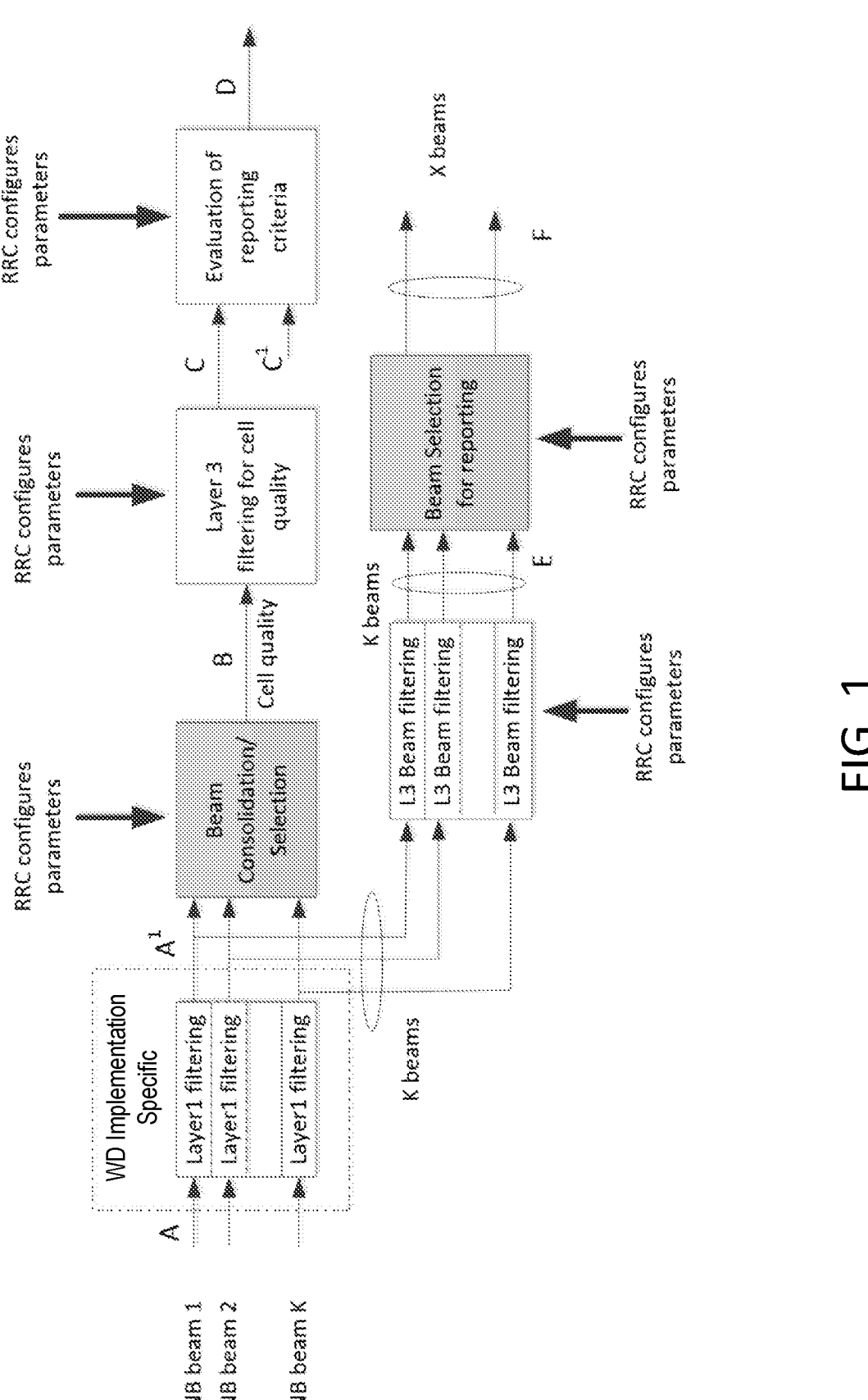
FIG. 1 is a schematic diagram of a measurement model.
Figure 2:
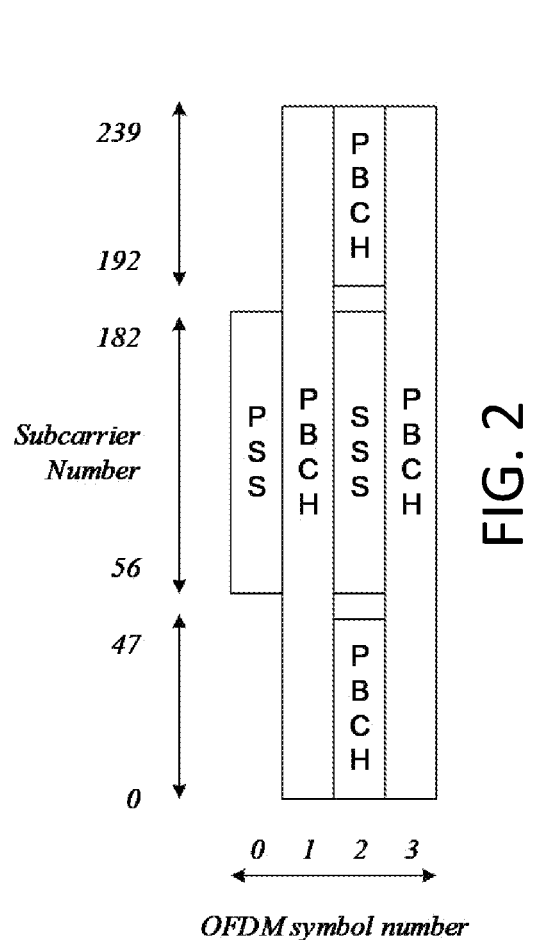
FIG. 2 is a schematic diagram related to synchronization signals.
Figure 3:
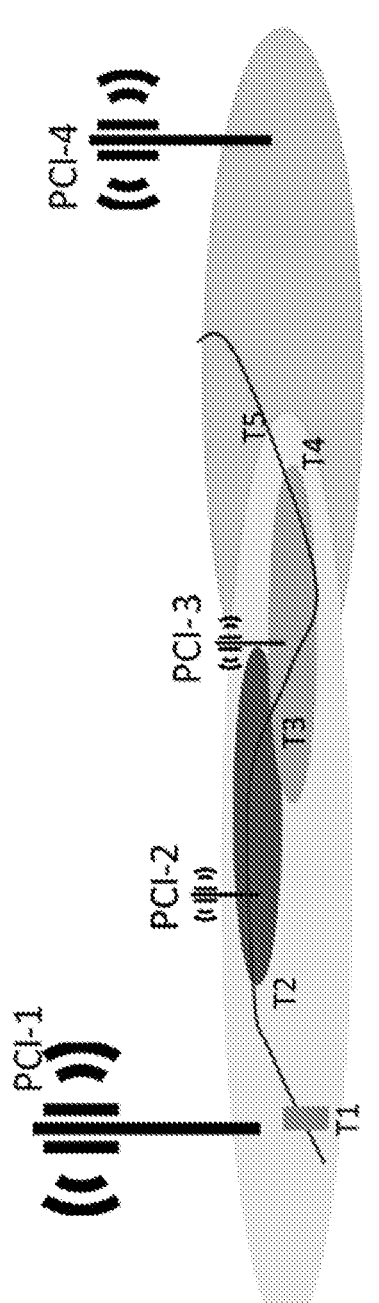
FIGS. 3-6 are schematic diagrams of a network with multiple PCIs.

Even though 3GPP has not decided how a L1/L2 inter-cell centric mobility should be standardized, for this disclosure, the WD receives a L1/L2 signaling (instead of RRC signaling) indicating a TCI state (e.g., for physical downlink control channel (PDCCH)) possibly associated to an SSB whose PCI is not necessarily the same as the PCI of the cell the WD has connected to e.g., via connection resume or connection establishment. In other words, in the present disclosure, that L1/L2-centric inter-cell mobility procedure can be interpreted as a beam management operation expanding the coverage of multiple SSBs associated to multiple PCIs (e.g., possibly associated to the same cell or different cells). FIG. 3 illustrates an example network including multiple PCIs.

A problem solved by this disclosure is that, if the feature is available for a capable WD within an area covered by a set of PCIs, e.g., PCI-1, PCI-2, PCI-3, PCI-4, the WD can rely on beam management procedures i.e., L1 measurements/reporting and medium access control control element (MAC CE)/downlink control information (DCI) indications (or any other lower layer signaling like in radio link layer (RLC), MAC or PHY layers in the protocol sack). However, this area will most likely not be an "infinite" area e.g., possibly this would be an area within the control of the same distributed unit (DU) and/or common baseband pool. Hence, two scenarios are very likely to happen:

First scenario: An RRC_CONNECTED WD within a first area for which L1/L2-centric mobility is supported (and being configured with L1/L2-centric mobility within this first area) moves towards a second area for which L1/L2-centric mobility is supported;

Second scenario: An RRC_CONNECTED WD within a first area for which L1/L2-centric mobility is not supported (i.e., not configured with L1/L2-centric mobility within this first area) moves towards a second area for which L1/L2-centric mobility is supported;

In both scenarios the point is that the WD moves towards an area for which L1/L2-centric mobility is supported (neighbour area). The term "moves" indicate mobility but fundamentally it means the WD can detect cells/beams of that second area, and possibly trigger measurement report (e.g., based on A3 events).

Figures 4, 5:
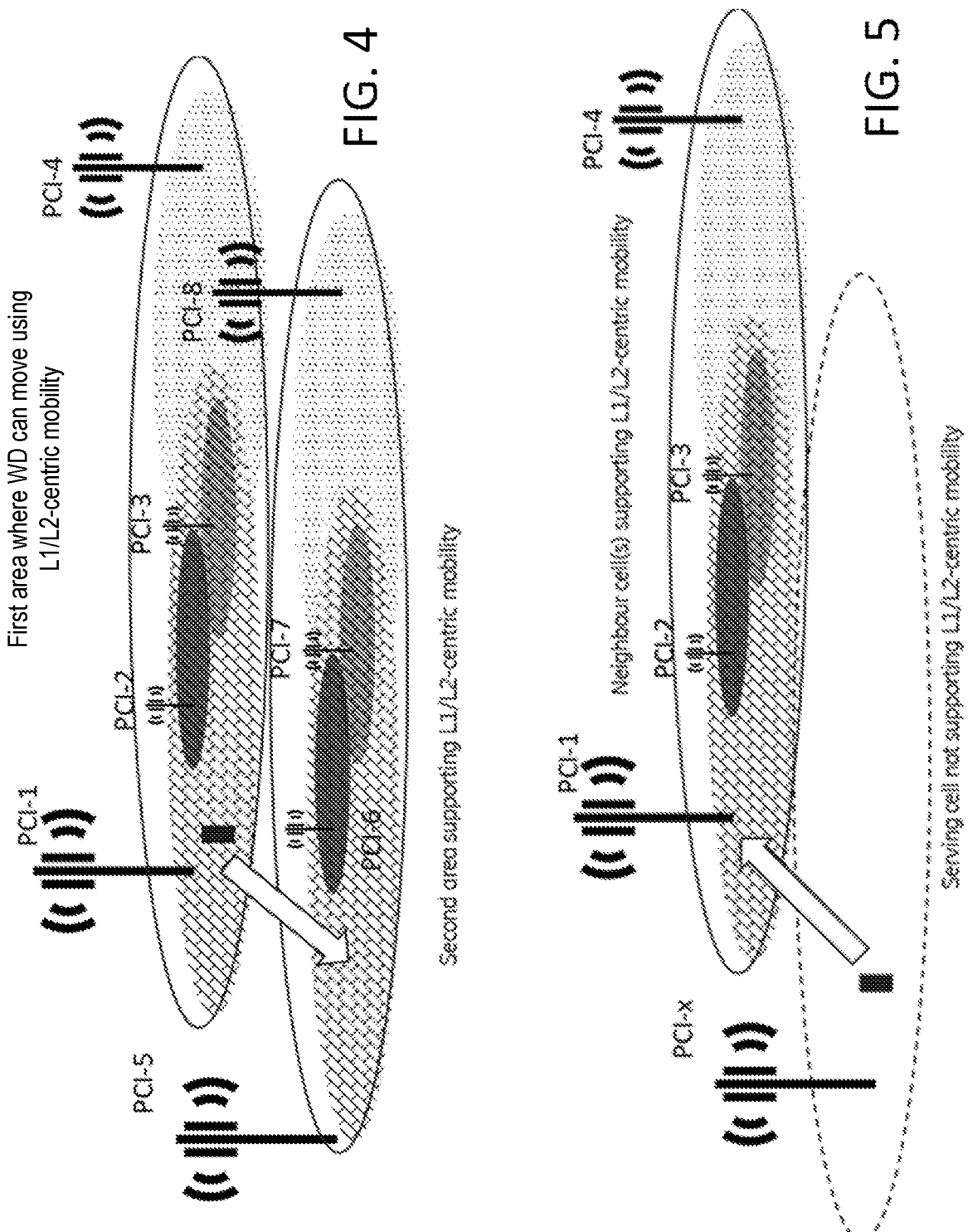

FIG. 4 shows an example illustration for the first scenario. FIG. 5 shows an example illustration for the second scenario.

Regardless of whether or not lists are provided within a measurement object associated to event-triggered measurement reporting configuration (within reportConfig of IE ReportConfigNR), a legacy WD considers one PCI for each neighbour cell (also called non-serving cells, which may be a white listed cell, or a list cell with cell-specific offsets) that needs to be measured (e.g., for cell RSRP) and reported. In other words, in existing arrangements, for performing neighbour cell measurements, the WD relies on a 1-to-1 association between a unique PCI per frequency (for a properly configured network i.e., without risks of PCI collision) and a cell. If this legacy approach is used for a WD capable of L1/L2-centric mobility detecting neighbors cells associated to an area for which it is possible to perform L1/L2-centric mobility, sub-optimal event-triggering would occur.

As more detail, assume that a solution for L1/L2 centric mobility wherein a WD in RRC_CONNECTED could be connected to a serving cell associated to multiple PCIs and perform mobility among them with a TCI state update e.g., PCI-5, PCI-6 and PCI-7. If the legacy RRM solution for neighbour cell measurements, event triggering and reporting are used, the WD would consider these PCIs independently as if they would be different and completely independent cells. A consequence is that it may be the case that only a subset of them are considered as triggered cells in a measurement report.

A problem may occur, for example, if PCI-5 triggers a measurement report (e.g., based on A3) while PCI-6 and PCI-7 are not considered as if they were part of the same cell and, if they are not triggered cells, their quality are not even included in the measurement report, so that the network (e.g., target network node such as a gNodeB) is not aware of the overall quality of the whole area (or which cells/PCIs the WD is able to detect) wherein the WD could be configured to perform L1/L2-centric mobility in a target network node, e.g., gNB, e.g., after a handover to a target cell.

Another problem may occur if the network configured the WD to perform cell measurements based on the highest beam measurement quantity value per PCI e.g., the WD derives each cell measurement quantity based on SS/PBCH block as the highest beam measurement quantity value, where each beam measurement quantity is described in 3GPP TS 38.215. If the highest beam measurement quantity value of each of these PCIs fulfill the event condition, each of these cells are considered as triggered cells and are included in a measurement report. However, as the number of cells to be included in a measurement report is limited, each of these would take the place of another cell that could possibly be fulfilling the condition too.

Yet another problem may occur if the network configured the WD to perform cell measurements wherein each cell measurement quantity based on SS/PBCH block as the linear power scale average of the highest beam measurement quantity values above absThreshSS-BlocksConsolidation where the total number of averaged beams may not exceed nrofSS-BlocksToAverage, the WD would only average beams per PCI (as determined in 3GPP TS 38.215). And, a consequence is that there would be more measurement reports that necessary, and, depending on the network implementation, there could be a higher number of ping-pong handovers (if a cell is actually comprised with multiple PCIs).

If it is assumed a solution for L1/L2 centric mobility wherein a WD in RRC_CONNECTED could be configured with multiple serving cell(s), each associated to its PCI, and perform mobility among them with a TCI state update, e.g., PCI-5, PCI-6 and PCI-7, similar issues as described above may occur.

Figure 6:
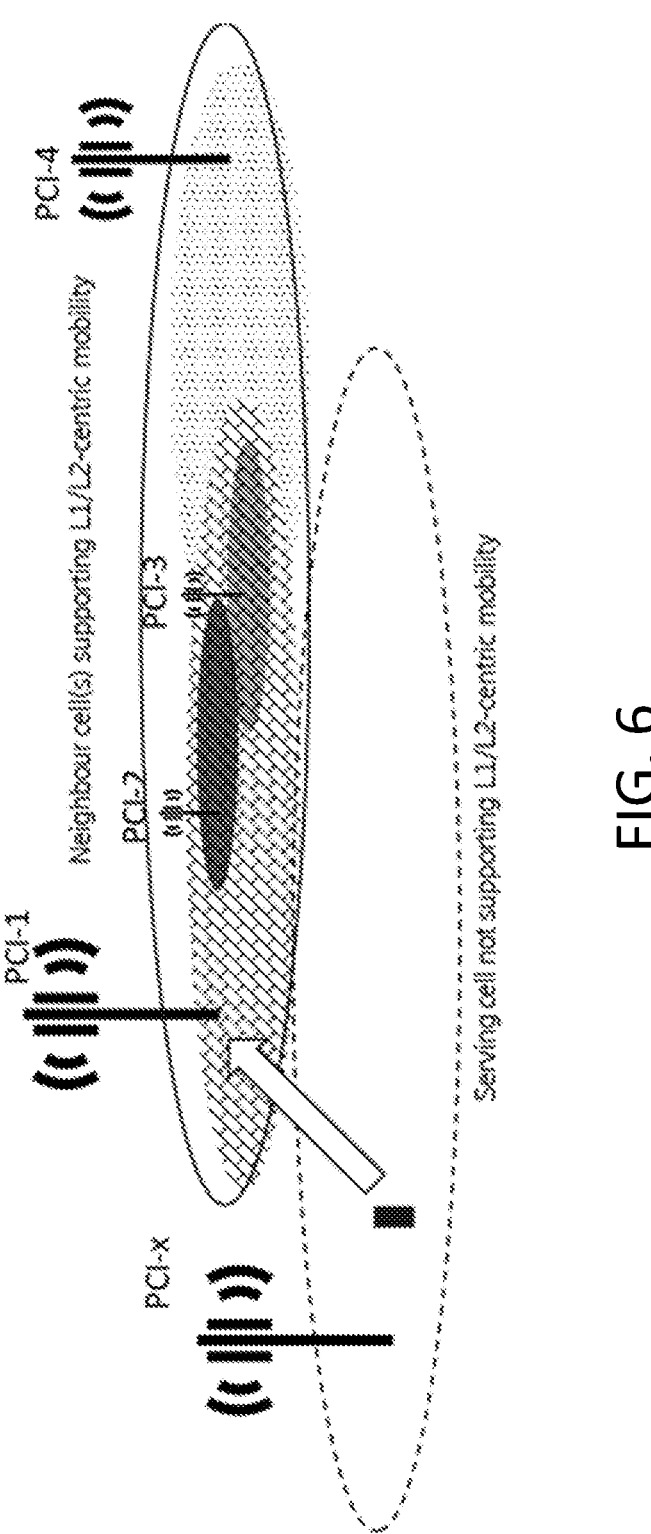

The present disclosure includes methods in a wireless terminal (e.g. UE or WD) the method comprising the WD performing neighbour measurements (i.e., measurements on neighbor cells on serving or non-serving frequencies), such as RSRP and/or RSRQ and/or SINR measurements of at least one neighbour using multiple PCIs, wherein a WD is capable of performing L1/L2 centric mobility. In other words, if the WD would perform a handover to a neighbour cell in that area, the WD could be configured to perform L1/L2-centric mobility within that area. The method also comprising the WD reporting these neighbour measurements performed according to the method. FIG. 6 shows an example network that may utilize some embodiments of the present disclosure.

Some embodiments include methods for a network node (e.g., a gNB) for configuring a WD to perform neighbour measurements (i.e., measurements on non-serving frequencies), such as RSRP and/or RSRQ and/or SINR measurements, wherein a neighbour cell is associated to an area covered by multiple PCIs wherein the network can configure a WD to perform L1/L2 centric mobility. The method also comprises the network receiving neighbour measurements (e.g., in a measurement report), wherein the measurements have been performed according to the method. The method also comprises the network taking decisions based on these measurements e.g., determining whether it should configure the WD with L1/L2-centric mobility or not, and if so, which PCIs to configure the WD to perform L1/L2-centric mobility (e.g., in case there is a limited number of PCIs to be configured for L1/L2-centric mobility and the area supports more PCIs than what the WD can be configured with).

The method may be applicable to two different example approaches:

Solution 1) Intra-cell multi-PCI L1/L2 centric mobility, where same serving cell configuration is associated to more than one PCI; For measurements on neighbors, according to the method, the implication is that a neighbour cell the WD is configured to perform measurements is associated to more than one PCI;

Solution 2) Inter-cell multi-PCI L1/L2 centric mobility, where WD has several serving cell configurations with respective PCIs associated but TCI state may refer to other serving cell PCIs; For measurements on neighbors, according to the method, the implication is that a WD detects and measures multiple cells, each with respective PCIs, but can be configured to treat multiple cells as a set when performing event evaluations and "cell" quality derivation (wherein this would be an equivalent cell quality, based on measurements on cells from a configured set of cells).

A general advantage of the method is to configure a WD to detect and measure a neighbour cell in the same way as that cell could be used if the WD would move there, e.g., via handover/reconfiguration with sync. In other words, if a set of PCIs the WD can detect as neighbors are in fact a set of PCIs wherein the WD could perform L1/L2-centric mobility if the WD would have been in that area, this is taken into account when the WD perform RRM measurement on these neighbors e.g., by combining PCIs or consolidating measurement per area (e.g., set of PCIs, instead of treating PCIs as completely independent cells as in legacy).

One benefit, for example, is if only PCI-5 triggers a measurement report (e.g., based on A3, when best beam of PCI-5 fulfills the condition), measurements (cell and beams) for PCI-6 and PCI-7 could be included even if they are not triggered cells, so that the network (e.g., target network node such as a gNodeB) is aware of the overall quality of the whole area (or which cells/PCIs the WD is able to detect) wherein the WD could be configured to perform L1/L2-centric mobility in case a handover would be triggered for that target network node.

Another benefit may result if the network configured the WD to perform cell measurements based on the highest beam measurement quantity value, e.g., WD derives each cell measurement quantity based on SS/PBCH block as the highest beam measurement quantity value, where each beam measurement quantity is described in 3GPP TS 38.215. If the highest beam measurement quantity value of each of these PCIs fulfill the event condition, all these PCIs are considered as triggered cells but they are counted as a single cell (wherein the highest beam represents a cell quality for the set of PCIs). As the number of cells to be included in a measurement report is limited, these PCIs would not take the place of another cell that could possibly be fulfilling the condition too.

Another benefit may be obtained if the network configured the WD to perform cell measurements wherein each cell measurement quantity based on SS/PBCH block as the linear power scale average of the highest beam measurement quantity values above absThreshSS-BlocksConsolidation where the total number of averaged beams may not exceed nrofSS-BlocksToAverage. The WD would not average beams per PCI (as determined in TS 38.215) thus, there would not be more measurement reports that necessary, and, ping-pong handovers (if a cell is actually comprised with multiple PCIs) could be avoided, and signaling over the air due to measurement reports could be prevented.

If Solution 2) for L1/L2 centric mobility is assumed, somewhat similar advantages would exist. The difference is that different PCIs described above would be associated to different cells wherein the WD could possibly move using L1/L2 signaling.

Before describing in detail exemplary embodiments, it is noted that the embodiments reside primarily in combinations of apparatus components and processing steps related to L1/L2—centric mobility—neighbor cell measurements. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), gNB, evolved Node B (eNB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" may be used to also denote a WD or a radio network node.

In some embodiments, the non-limiting terms WD or UE are used interchangeably The WD can be any type of wireless device capable of communicating with a network node or another WD over radio signals. The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

The term "radio measurement" may refer to any measurement performed on radio signals. Radio measurements can be absolute or relative. Radio measurement may be called as signal level which may be signal quality and/or signal strength. Radio measurements can be e.g., intra-frequency, inter-frequency, inter-RAT measurements, CA measurements, etc. some examples of radio measurements are RSRP, RSRQ, SINR, Signal Noise Ratio (SNR), interference power, total interference plus noise, Received Signal Strength Indicator (RSSI), noise power, etc.), cell detection or cell identification, radio link monitoring (RLM), system information (SI) reading, etc.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may also be directly to another node or via a third node.

Configuring a Radio Node

Configuring a radio node, e.g. a WD, may refer to the radio node being adapted or caused or set and/or instructed to operate according to the configuration. Configuring may be done by another device, e.g., a network node or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

In particular, configuring a terminal (e.g., WD) may comprise configuring the WD to perform certain measurements on certain subframes or radio resources and reporting such measurements according to embodiments of the present disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Figure 7:
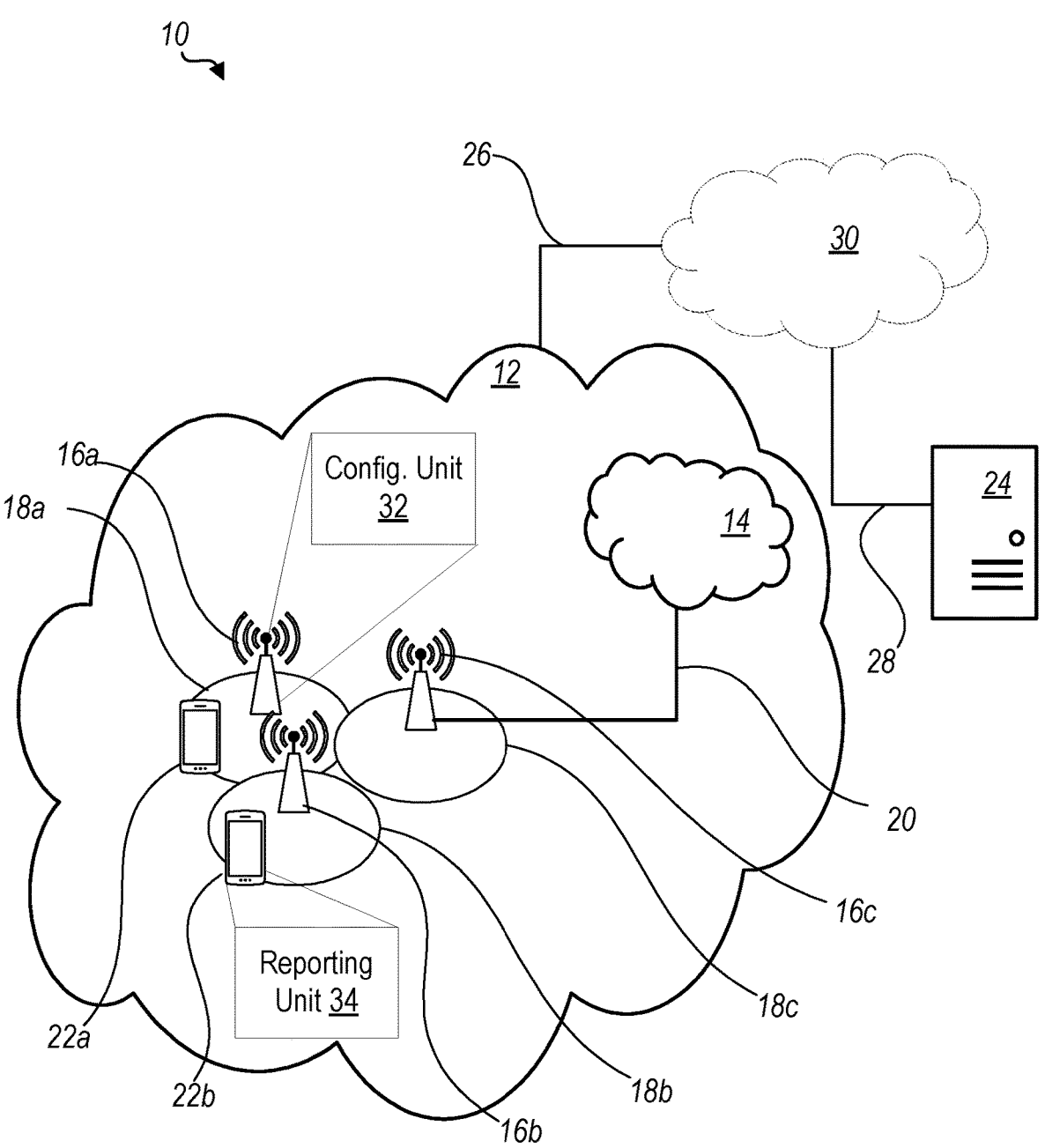
FIG. 7 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 7 a schematic diagram of a communication system according to an embodiment, such as a 3GPP-type cellular network that may support standards such as LTE and/or NR, which comprises an access network 12, such as a radio access network, and a core network 14. The access network 12 comprises a plurality of network nodes 16a-16c (referred to collectively as network nodes 16), such as eNBs, gNBs or other types of wireless access points, each defining a corresponding coverage area 18a, 18b, 18c (referred to collectively as coverage areas 18). Each network node 16a-16c is connectable to the core network 14 over a wired or wireless connection 20. A first WD 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 7 as a whole enables connectivity between one of the connected WDs 22*a*, 22*b* and the host computer 24.

Example implementations, in accordance with an embodiment, of the WD 22, network node 16 and host computer 24 discussed in the preceding paragraphs will now be described with reference to FIG. 8. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, e.g. a central processing unit (CPU), and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor can perform host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters/receivers/transceivers. The communication interface may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor (e.g. CPU), and memory, the processing circuitry 68 may comprise integrated circuitry for processing and/or control, e.g., one or more processors and/or processor cores and/or FPGAs and/or ASICs adapted to execute instructions. The processor 70 may be configured to access (e.g., write to and/or read from) the memory 72, which may comprise any kind of volatile and/or nonvolatile memory, e.g., cache and/or buffer memory and/or RAM and/or ROM and/or optical memory and/or EPROM.

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 can perform network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16.

The communication system 10 further includes the WD 22. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters/receivers/transceivers.

The hardware 80 of the WD 22 further includes processing circuitry 84. The processing circuitry 84 may include a processor 86 and memory 88. In particular, in addition to or instead of a processor (e.g. CPU), and memory, the processing circuitry 84 may comprise integrated circuitry for processing and/or control, e.g., one or more processors and/or processor cores and/or FPGAs and/or ASICs adapted to execute instructions. The processor 86 may be configured to access (e.g., write to and/or read from) memory 88, which may comprise any kind of volatile and/or nonvolatile memory, e.g., cache and/or buffer memory and/or RAM and/or ROM and/or optical memory and/or EPROM.

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24.

The processing circuitry 84 may be configured to control any of the methods and/or processes described herein and/or to cause such methods, and/or processes to be performed, e.g., by WD 22. The processor 86 is used to perform WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 8:
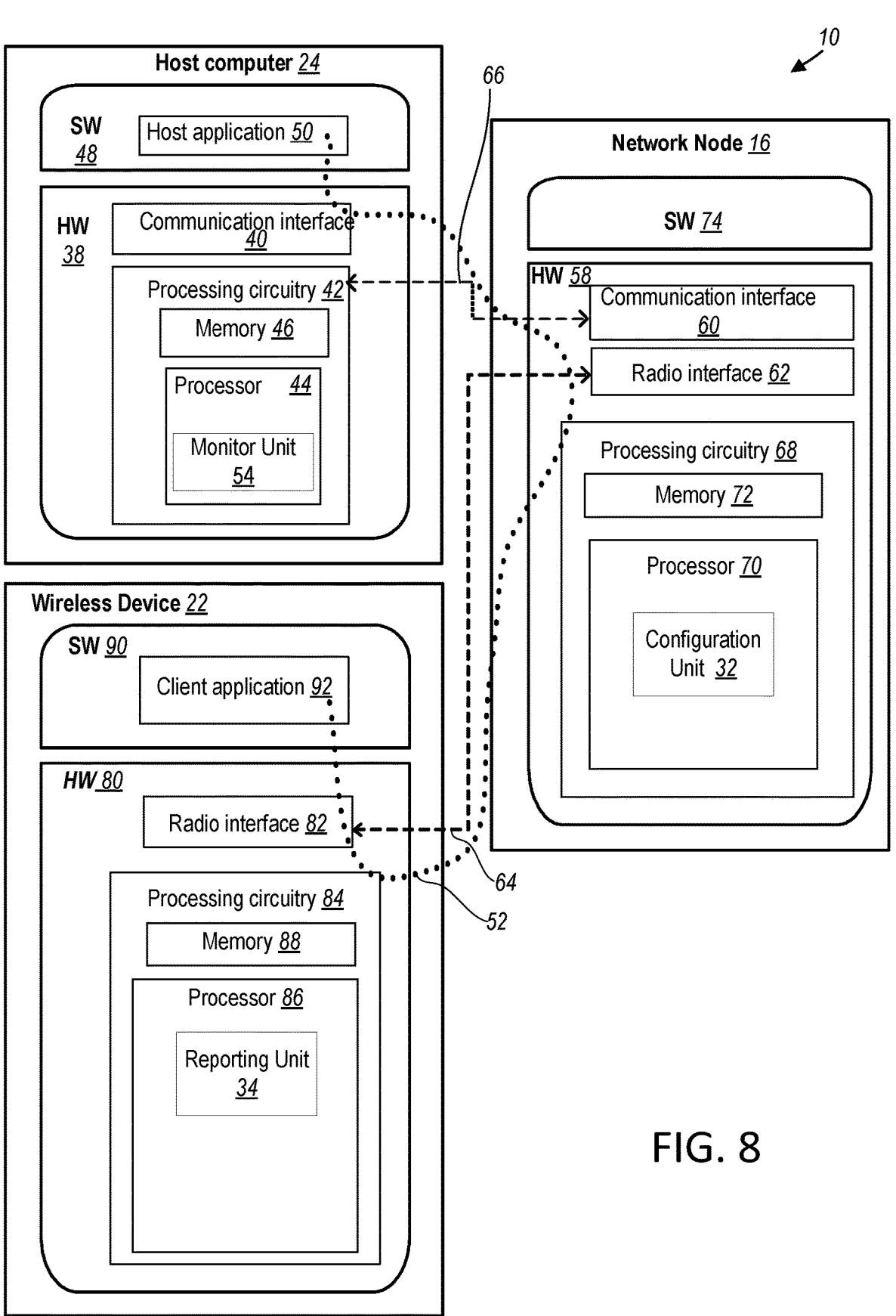
FIG. 8 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 8 and independently, the surrounding network topology may be that of FIG. 7.

Although FIGS. 7 and 8 show various "units" such as configuration unit 32, and reporting unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 9 is a flowchart of an exemplary process in a network node 16 according to some embodiments. One or more Blocks and/or functions and/or methods performed by the network node 16 may be performed by one or more of processing circuitry 68, processor 70, radio interface 62. The example method includes configuring (Block S134), the WD to perform neighbor cell measurements on at least one neighbor cell, the at least one neighbor cell being associated with multiple PCIs. The method includes receiving (Block S136) neighbor cell measurements based on the configuration. The method includes determining (Block S138 whether to configure the WD to perform layer 1/layer2-centric mobility based on the received neighbor cell measurements.

In some embodiments, the neighbor cell measurements measure at least one of a RSRP, a RSRQ and a SINR associated with the at least one neighbor cell.

FIG. 10 is a flowchart of an exemplary process in a wireless device 22 according to some embodiments. One or more Blocks and/or functions and/or methods performed by WD 22 may be performed by one or more of processing circuitry 84, processor 86, radio interface 82, etc. The example method includes receiving (Block S140) a configuration to perform neighbor cell measurements on at least one neighbor cell, the at least one neighbor cell being associated with multiple PCIs. The method includes performing (Block S142) neighbor cell measurements using the multiple PCIs based on the configuration. The method includes reporting (Block S144) the neighbor cell measurements. The method includes based on the reported neighbor cell measurements, receiving (Block S146) a configuration to perform L1/L2-centric mobility.

In some embodiments, the neighbor cell measurements measure at least one of a RSRP, a RSRQ and a SINR associated with the at least one neighbor cell.

Figure 11:
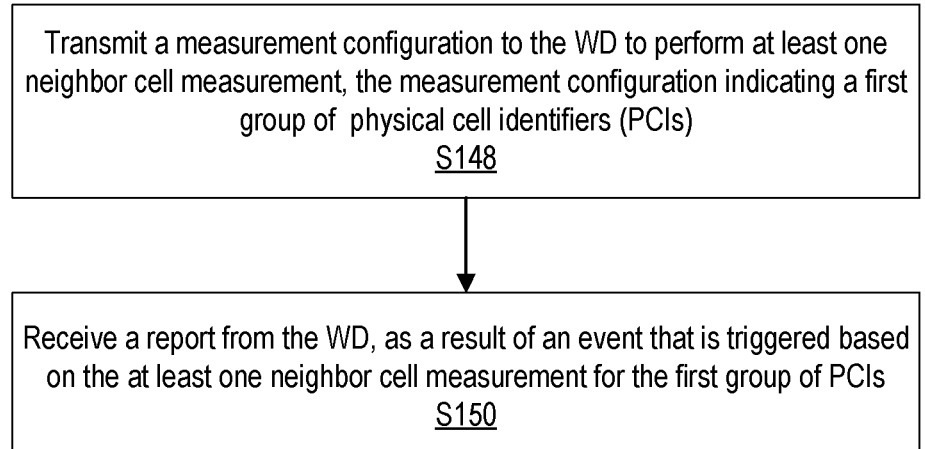
FIG. 11 is a flowchart of an exemplary process in a network node according to some embodiments of the present disclosure.

FIG. 11 is a flowchart of an exemplary process in a network node 16 according to some embodiments. One or more Blocks and/or functions and/or methods performed by the network node 16 may be performed by one or more of processing circuitry 68, processor 70, radio interface 62. The example method includes transmitting (Block S148) a measurement configuration to the WD to perform at least one neighbor cell measurement, the measurement configuration indicating a first group of PCIs. The method includes receiving (Block S150) a report from the WD, as a result of an event that is triggered based on the at least one neighbor cell measurement for the first group of PCIs.

In some embodiments, the measurement configuration comprises a list of a plurality of PCIs and at least one PCI in the list is associated with a first group identifier, ID, identifying the first group. In some embodiments, the measurement configuration comprises a list of groups including the first group and a first group identifier, ID, is associated with the first group. In some embodiments, the measurement configuration indicates a range of PCIs that are comprised in the first group. In some embodiments, the measurement configuration indicates at least one cell-specific offset for each PCI in the first group. In some embodiments, the measurement configuration indicates to the WD to perform the at least one neighbor cell measurement based on the first group on a single neighbor cell, the single neighbor cell being associated with the measurement configuration and the first group of PCIs.

In some embodiments, the at least one neighbor cell measurement comprises measurements performed on a plurality of beams in the single neighbor cell that is associated with the first group of PCIs and the report is based on one of: a selection of one of the measurements to represent a cell quality of the first group and an average of the measurements to derive the cell quality of the first group. In some embodiments, the measurement configuration further indicates a first PCI out of the first group of PCIs to trigger an event evaluation for the first group and the performance of the at least one neighbor cell measurement for the first group comprises measuring only a reference signal associated with the indicated first PCI to derive a cell quality for the first group.

In some embodiments, the measurement configuration indicates to the WD to perform the at least one neighbor cell measurement for the first group on a plurality of neighbor cells, each neighbor cell in the plurality of neighbor cells being identified by a corresponding PCI in the first group of PCIs. In some embodiments, the at least one neighbor cell measurement comprises measurements performed on a plurality of beams in the plurality of neighbor cells and the report is based on one of: a selection of one of the measurements to represent a cell quality of the first group and an average of the measurements to derive the cell quality of the first group. In some embodiments, the measurement configuration further indicates a first PCI out of the first group of PCIs to trigger an event evaluation for the first group and the performance of the at least one neighbor cell measurement for the first group comprises measuring only a reference signal associated with the indicated first PCI to derive a cell quality for the first group.

Figure 12:
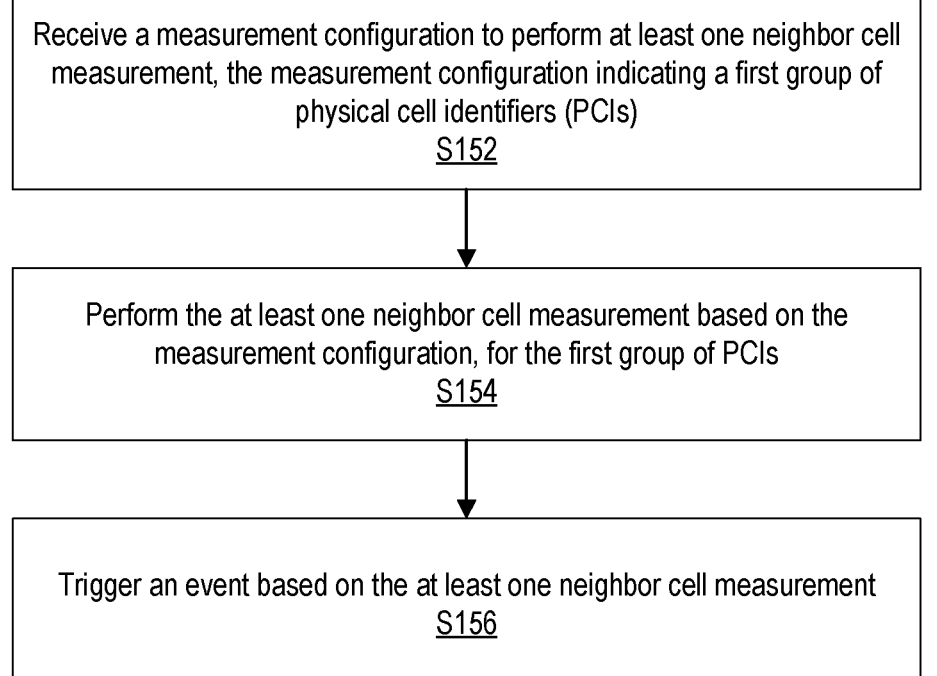
FIG. 12 is a flowchart of an exemplary process in a wireless device according to some embodiments of the present disclosure.

In some embodiments, an event is triggered based on the measurements. In some embodiments, the triggered event is a measurement reporting and the method further comprises, as a result of the triggered event, receiving measurement results comprising a plurality of measurement results associated with the first group of PCIs and a first group identifier, ID. FIG. 12 is a flowchart of an exemplary process in a wireless device 22 according to some embodiments of the present disclosure. One or more Blocks and/or functions and/or methods performed by WD 22 may be performed by one or more of processing circuitry 84, processor 86, radio interface 82, etc. The example method includes receiving (Block S152) a measurement configuration to perform at least one neighbor cell measurement, the measurement configuration indicating a first group of PCIs. The method includes performing (Block S154) the at least one neighbor cell measurement based on the measurement configuration, for the first group of PCIs. The method includes triggering (Block S156) an event based on the at least one neighbor cell measurement.

In some embodiments, the measurement configuration comprises a list of a plurality of PCIs and at least one PCI in the list is associated with a first group identifier, ID, identifying the first group. In some embodiments, the measurement configuration comprises a list of groups including the first group and a first group identifier, ID, is associated with the first group. In some embodiments, the measurement configuration indicates a range of PCIs that are comprised in the first group. In some embodiments, the measurement configuration indicates at least one cell-specific offset for each PCI in the first group. In some embodiments, the WD is configured to perform the at least one neighbor cell measurement based on the first group on a single neighbor cell, the single neighbor cell being associated with the measurement configuration and the first group of PCIs.

In some embodiments, the method further includes measuring a plurality of beams of the single neighbor cell associated with the first group of PCIs and one of: selecting one of the measurements to represent a cell quality for the first group and averaging the measurements to derive the cell quality of the first group. In some embodiments, the measurement configuration further indicates a first PCI out of the first group of PCIs to trigger an event evaluation for the first group and the performance of the at least one neighbor cell measurement based on the first group comprises measuring only a reference signal associated with the indicated first PCI to derive a cell quality for the first group. In some embodiments, performing the at least one neighbor cell measurement based on the first group on a plurality of neighbor cells, each neighbor cell in the plurality of neighbor cells being identified by a corresponding PCI in the first group of PCIs.

In some embodiments, the method further includes measuring a plurality of beams of the plurality of neighbor cells associated with the first group of PCIs and one of: selecting one of the measurements to represent a cell quality of the first group and averaging the measurements to derive the cell quality of the first group. In some embodiment, the measurement configuration further indicates a first PCI out of the first group of PCIs to trigger an event evaluation for the first group and the performance of the at least one neighbor cell measurement for the first group comprises measuring only a reference signal associated with the indicated first PCI to derive a cell quality for the first group.

In some embodiments, the method further comprises triggering an event based on the measurements. In some embodiments, the triggered event is a measurement reporting and the method further comprises, responsive to the triggered event, sending measurement results comprising a plurality of measurement results associated with the first group of PCIs and a first group identifier, ID.

Having described the general process flow of arrangements of the disclosure and having provided examples of hardware and software arrangements for implementing the processes and functions of the disclosure, the sections below provide details and examples of arrangements for L1/L2—centric mobility—neighbor cell measurements, which may be implemented by the network node 16, wireless device 22 and/or host computer 24. The term "beam" is used to refer to SSB or layer 3 configured channel state information reference signal (CSI-RS) in the following sub-section.

L1/L2 Centric Mobility

Reference is made to the term "L1/L2 inter-cell centric mobility" as used in the in 3GPP. The understanding for this disclosure (i.e., the derivation of cell quality e.g., compute the RSRP of a neighbour cell) is that the WD 22 in RRC_CONNECTED is connected (i.e., being served by) to a serving cell, considered to be the PCell.

The WD 22 is configured (e.g., by network node (NN) 16) to perform radio resource management (RRM) measurements (according to a MeasConfig), e.g., in support to RRC based mobility (i.e., reconfiguring with sync) on neighbour cells, wherein a neighbour cell is associated to a NN 16 (e.g., gNodeB) controlled by a DU (e.g., in a baseband) for which the WD 22 is able to be configure to perform L1/L2-centric mobility. In the multi-beam scenario, a cell can be associated to multiple SSBs, and during a half-frame, different SSBs may be transmitted in different spatial directions (i.e., using different beams, spanning the coverage area of a cell).

In that incoming "area", wherein the WD 22 is capable of performing L1/L2 inter-cell centric mobility, the WD 22 would be configured (e.g., by NN 16) with multiple PCIs (e.g., PCI-1 toPCI-4), wherein each PCI, or equivalently stated, any SSB beam related to the PCI, can be used as a Quasi-Co-Location (QCL) source in a TCI state the WD 22 is configured with.

Reference is also made herein to a group of multiple PCIs, or a set of PCIs, or a pool of PCIs, or a list of PCIs, or a sequence of PCIs, which all interchangeably refer to the same concept.

In existing arrangements, when multiple PCIs are configured for the WD's 22 serving cell, the WD 22 assumes that the QCL source of a TCI state is a RS associated to the serving cell's first PCI (i.e., the PCI in ServingCellConfigCommon). In this disclosure, the association between multiple PCIs and cells (e.g., multiple PCIs associated to a neighbour cell) is provided as part of the MeasConfig, e.g., within a measurement object (for a given frequency). Much of the disclosure considers the example of the WD 22 handling neighbour cell measurements associated to a single measurement object, however, the method also comprises the WD 22 being configured with multiple measurement object wherein the feature is configured.

Solution 1) Intra-cell multi-PCI L1/L2 Centric Mobility

In existing arrangements, the WD 22 can receive a MAC CE from the network (e.g., by NN 16) to indicate the TCI state to be associated to a given PDCCH configuration, while PDSCH TCI state association can be provided via DCI. Upon reception the WD 22 knows which TCI state (e.g., in which downlink beam PDCCH is being transmitted and should be monitored/received) is associated to a given PDCCH configured to be monitored. In other words, in a system where SS/PBSH Blocks (SSB)s are transmitted in different beams for a given cell with a given PCI, a TCI indication for a given PDCCH configurations triggers the WD 22 to monitor PDCCH in a given beam of that cell associated to its PCI, in this case, a beam/SSB of the serving cell where that TCI state is configured.

However, for the Solution 1, for a given serving cell configuration, there can be a different PCI in a TCI state configuration compared to the PCI in ServingCellConfig-Common, e.g., PCI-1, which is an additional PCI e.g., PCI-2. In that case, the WD 22 receiving the MAC CE (e.g., sent by NN 16) determines the PCI associated to the indicated TCI, to determine the SSB (or CSI-RS) associated, hence, determine the downlink beam. If it receives a TCI with PCI indicating PCI-2, for example, the WD 22 monitors PDCCH in a beam/SSB associated to PCI-2.

In a first variant of solution 1, the ServingCellConfig-Common before and after the TCI state indication associated to a different PCI than the one in ServingCellConfigCom-mon (e.g., PCI-2) remains the same, except for the PCI; Hence, the WD 22 is still assumed to be in the same cell after the TCI state indication (e.g., MAC CE) whose TCI state has a different PCI associated to it (not necessarily signaled in the MAC CE, as the TCI state identifier in the MAC CE enables the WD 22 to identify the PCI associated). This variant is referred to as Same cell, change PCI, similar ServingCellConfigCommon.

In a second variant of solution 1, the WD 22 is configured with at least one PCI-specific configuration. In other words, the WD 22 has a ServingCellConfigCommon, valid for the PCI indicated on it, but it contains some further PCI-specific configuration so that upon receiving an indication for a different PCI the WD 22 switches configuration. This variant is referred to as Same cell, change PCI, ServingCellConfig-Common has some PCI-specific configuration(s).

In this example, the WD 22 may apply the new Serving-CellConfigCommon (for the new PCI in the MAC CE) on top of the previous ServingCellConfigCommon (e.g., in a delta-signaling manner). That reduces the amount of signaling for the PCI-specific configurations, in case some of the configurations are the same).

Another way to configure the WD 22 is that serving cell config WD 22 is configured with SSB sets that has other PCIs associated to it. These SSB sets would have an index and in TCI state configuration an index of SSB set is referred to together with exact SSB beam index from that SSB set. It is possible these sets will be named differently to reflect "inter PCI candidates", thus SSB set index is an example of an RRC configuration specific ID given to the PCI(SSB set) to be used in the L1/L2 mobility in WD's 22 current RRC configuration.

According to the method, the WD 22 is configured (e.g., by NN 16) to perform neighbour measurements (measurement on non-serving cells), wherein a neighbour cell is associated to multiple PCI(s) e.g., PCI-5, PCI-6, PCI-7. That means that if the WD 22 would connect to that neighbour cell (e.g., via handover, reconfiguration with sync), it should be possible to perform L1/L2-centric mobility.

Solution 2) Inter-cell multi-PCI L1/L2 Centric Mobility

In existing arrangements, the WD 22 assumes that the QCL source of a configured TCI state is a RS associated to the serving cell's single configured PCI (i.e., the PCI in ServingCellConfigCommon). However, in Solution 2, the WD 22 can be configured with a different PCI in the TCI state configuration wherein these PCIs are considered to be associated with different cells. That is, WD 22 can have different serving cell configurations for these PCIs.

In other words, the WD 22 is configured with a list of TCI states, meaning that it is configured with a list of additional cells, as the different PCIs are PCIs of different cells (each TCI state has its own PCI, but the same PCI may be used by multiple TCI states). These could be considered as some kind of serving cells e.g., if these are all in the same frequency (like same ARFCN for their SSB) these could be considered as intra-frequency serving cells, where one is considered to be active at the time (except if some form of multi-TRP transmission is enabled).

According to the method, the WD 22 is configured to perform neighbour measurements, wherein a neighbour cell is associated to a PCI, and there can be multiple cells detected e.g., cell-5→PCI-5, cell-6→PCI-6, cell-7→PCI-7, wherein multiple cells can form a group of cells for L1/2-centric mobility. For these groups of cells, in which it is possible to perform L1/2-centric mobility, according to the method, the WD 22 does not consider them as independent PCIs when performing neighbour cell measurements (e.g., for cell quality derivation) and/or when triggering an event e.g., A3 to A6.

That means that if the WD 22 connects to one of these neighbour cells (e.g., via handover, reconfiguration with sync), like PCI-6, it should be possible to perform L1/L2-centric mobility and/or the network could configure the WD 22 to perform L1/L2-centric mobility when moving between e.g., cell-5→PCI-5, cell-6→PCI-6, cell-7→PCI-7.

Regardless which variant of solution 2 or 1 is considered, a problem may still remain: namely, that the WD 22 may detect PCIs (associated to one cell in Solution 1, or associated to multiple cells in Solution 2) associated to a measurement object, for which the WD 22 needs to perform neighbour cell measurements, and according to the method, not treat them as completely independent cells. There can be different ways they are treated as a set/group of cells (in Solution 2) or PCIs (in solution 1), which is detailed herein above.

It is noted that what is called "changing cell" or "inter-cell" herein does not have the same meaning as changing serving cell as in legacy. Further details will be provided within the document e.g., concerning how that relates to the way the WD 22 performs cell quality derivation.

Further Considerations on Terminology

The present disclosure mainly refers to the problem of mobility, i.e., when the WD 22 is transmitting/receiving from one so-called source cell and triggers a procedure to start transmitting/receiving from another cell so-called target cell. However, many aspects of the present disclosure are also applicable for multi-Transmission Reception Point (TRP) transmissions where the WD 22 may be connected simultaneously to multiple cells/PCI(s). In that case, instead of changing from one cell to another the WD 22 would add/remove (activate/deactivate) a cell using lower layer signaling (i.e., signaling in a protocol layer below RRC like PDCP, RLC, MAC or PHY signaling). The term L1/L2 inter-cell centric mobility is often used in the document to refer to this feature.

The present disclosure also refers to L1/L2 signaling and MAC CEs sometimes interchangeably. MAC CE is indeed an example to be considered for a L1/L2 signaling for L1/L2-centric inter-cell mobility, however the methods are not limited to that. Another example of L1/L2 signaling for L1/L2-centric inter-cell is a DCI, which may also indicate a TCI state (that may be mapped to a PCI, hence may also be used for mobility).

The present disclosure uses the terminology of 5G NR in its specifications (such as the terminology from 3GPP TS 38.331, TS 38.321 and 3GPP TS 38.215). However, that should not be interpreted as a limiting factor. This terminology is for example and ease of understanding. In fact, the method may be applicable for any radio access technology (RAT) where the concept of TCI states (or equivalent, like beam-based mobility) is applicable.

The present disclosure refers to group of PCIs/cells or sets of PCIs/cells as the same concept.

The present disclosure uses the term neighbour measurements to refer to measurements performing on non-serving frequencies. Sometimes the term neighbour cell measurements is used as synonym. That can be on a PCI, a cell or a beam (associated to a PCI and/or a cell). That comprises at least RSRP and/or RSRQ and/or SINR performed on reference signals (e.g., SSBs associated to a serving cell). For example, neighbour measurements when the WD 22 is configured (e.g., by NN 16) with multiple PCI(s) for a given measurement objects so that these PCIs are not treated independently as in prior art. Another way to express that is to say that the WD 22 performs Cell Quality Derivation (CQD) associated to a measurement object whose configuration is associated to sets or groups of PCI(s). In summary, when the present disclosure refers to measurement it may refer to one or more of at least the following:

NR measurements;

Inter-RAT measurements of E-UTRA frequencies.

Inter-RAT measurements of UTRA-FDD frequencies.

Measurement results per SS/PBCH block;

Measurement results per cell based on SS/PBCH block(s);

SS/PBCH block(s) indexes.

Measurement results per CSI-RS resource;

Measurement results per cell based on CSI-RS resource(s); and

CSI-RS resource measurement identifiers.

In step S140 of FIG. 10, when the WD 22 can: receive a measurement configuration (e.g., sent by NN 16) indicating for the WD 22 to perform neighbour cell measurements associated to a given measurement object/frequency, it can also Receive an indication of at least one group (set or list) of multiple PCIs associated to the measurement object;

Option a) List of PCI(s) within MO, where each PCI has a group ID;

Option b) List of groups where each group has a list of PCI(s);

In step S142, the WD can perform measurements per group based on the multiple PCIs of each group/set as follows Single PCI indicated by network per group is used for event evaluation If solution 1) a single PCI is indicted as representative for the group, so WD 22 perform CQD based on it, and use that as input to event triggering evaluations If solution 2) one cell out of the multiple configured cells in a group is indicted as representative cell for the group, so WD 22 perform CQD based on it, and use that as input to event triggering evaluations Select the strongest PCI of the group, then perform CQD;

If solution 1) selecting strongest PCI (out of multiple) of the same neighbour cell;

If solution 2) selecting a representative cell for the set (out of multiple) wherein the WD 22 can perform L1 mobility, some kind of configured set of cells for L1 mobility;

Remove the weakest PCIs of the group, then perform CQD;

Combine PCIs for performing CQD and event evaluation

If solution 1) combining PCIs of the same neighbour cell;

If solution 2) combining PCIs of different cells wherein the WD 22 can perform L1 mobility, some kind of configured set of cells for L1 mobility;

When reporting these measurements per group/set pool/list as in S144, the WD considers the following:

In the previous step the WD 22 derives a single measurement quantity (e.g., a single RSRP value) per neighbour (associated to a set of PCIs) as the WD 22 either selects a PCI per group for performing measurements and to be used as input to event evaluations, or combines measurements on a set of PCIs to derive a single measurement quantity (e.g., a single cell quality, or an equivalent cell quality).

In case the method based on single PCI is used, that PCI is also included in the measurement report.

In case the selection method is used, i.e., if WD 22 selects a PCI for performing cell quality for a group of PCIs, that selected PCI is also included in the measurement report.

In cases of the combining of measurements from different PCIS were used, each PCI used for the measurements are included in the measurement report for the associated measId.

In another embodiment, the WD 22 performs CQD as in legacy, and WD 22 triggers events independently per neighbour cell as in legacy, wherein each cell is associated to a single PCI. However, if a set of PCIs is configured per neighbour, the WD 22 perform measurements for all the other PCIs. And, if a single PCI triggers a measurement report, measurement available for other PCIs in the same group are included. For example, if the WD 22 detects neighbour cells 1, 2, 3 in frequency A, with PCIs 1, 2, 3, and triggers a measurement report for cell 1. Then, it might be relevant for the network to know the quality of cells 2 and 3, so these are included in the measurement report associated to an event triggered for cell 1.

The present disclosure includes methods for a WD 22 for performing CQD) associated to a measurement object whose configuration is associated to sets or groups of PCI(s), and the WD 22 reporting at least one of the neighbour cell measurements performed accordingly.

Measurement Configuration

In one embodiment, the WD 22 receives a measurement configuration (e.g., from NN 16) indicating for the WD 22 to perform neighbour measurements associated to a given measurement object/frequency. The WD 22 receives an RRC Reconfiguration message (e.g., RRCReconfiguration or RRCResume message) comprising a measConfig field of MeasConfig IE, wherein that includes at least one measurement object (of IE MeasObjectNR, in case of NR frequencies). An example is shown below:

```
*******************************************************************
                              RRCReconfiguration message
-- ASN1START
-- TAG-RRCRECONFIGURATION-START
RRCReconfiguration ::=                    SEQUENCE {
  rrc-TransactionIdentifier                 RRC-TransactionIdentifier,
  criticalExtensions                      CHOICE {
    rrcReconfiguration                        RRCReconfiguration-IEs,
    criticalExtensionsFuture                  SEQUENCE { }
  }
}
RRCReconfiguration-IEs ::=                 SEQUENCE {
[ ... ]
  measConfig                              MeasConfig     OPTIONAL, -- Need M
[ ... ]
}
[ ... ]
MeasConfig ::=                            SEQUENCE {
[ ... ]
  measObjectToAddModList                      OPTIONAL, -- Need N
[ ... ]
}
MeasObjectToAddModList ::=                       SEQUENCE (SIZE (1 .. maxNrofObjectId)) OF
MeasObjectToAddMod
MeasObjectTo AddMod ::=                      SEQUENCE {
  measObjectId
  measObject                            CHOICE {
  measObjectNR                              MeasObjectNR,
[ ... ]
  }
}
*******************************************************************
```

The measurement object can comprise an indication of at least one group of multiple PCIs associated to the measurement object.

For example, that configuration can be provided at least as follows: Option a) List of PCI(s) within the measurement object (MO), where each PCI has a group identifier associated to it; then, when configuring multiple PCIs, if they are to be considered by the WD 22 a part of the same group, they are configured associated with the same group id.

An example of the signaling is shown below where for an MO, there is a list of PCIs (e.g., field cells-PCI-ToAddMod-List of IE Cells-PCI-ToAddModList) where each element (e.g., Cells-PCI-ToAddMod) has a PCI (field physCellId of IE PhysCellId) and a group ID (e.g., field groupId of IE INTEGER (0 . . . max-PCI-groups)), wherein max-PCI-groups is the maximum number of groups that can be configured.

of performing neighbour cell measurements, while PCI-8, PCI-9 and PCI-10 are handled as a set for the purpose of performing neighbour cell measurements e.g., beams from PCI-5, PCI-6 and PCI-7 are combined, etc.

Option b) List of groups where each group has a list of PCI(s); where each group has a group identifier associated to multiple PCIs; then, when configuring multiple PCIs, if they are to be considered by the WD 22 a part of the same group, they are configured within the same group i.e., associated with the same group id.

An example of the signaling is shown below where for an MO there is a list of groups (e.g., field physCellIdGroups-ToAddModList of IE PhysCellIdGroups-ToAddModList), wherein for each group (e.g., PhysCellIdGroups-ToAdd-Mod) there can be multiple PCIs associated (e.g., configured in the field physCellIdList of IE SEQUENCE (SIZE (1 . . . K)) OF PhysCellId), wherein each element has a groupID.

```
*******************************************************************
MeasObjectNR ::=                 SEQUENCE {
  ssbFrequency                   ARFCN-ValueNR          OPTIONAL, --
Cond SSBorAssociatedSSB
[ ... ]
  cells-PCI-ToAddModList                   Cells-PCI-ToAddModList OPTIONAL, -- Need N
[ ... ]
}
cells-PCI-ToAddModList ::=               SEQUENCE (SIZE (1 .. maxNrofCellMeas))
OF Cells-PCI-ToAddMod
Cells-PCI-ToAddMod ::=           SEQUENCE {
  physCellId                     PhysCellId,
groupId                                          INTEGER (0 .. max-
PCI-groups)
}
*******************************************************************
```

If the WD 22 is configured with PCI-5, PCI-6 and PCI-7 wherein each are associated to groupId=2, and with PCI-8, PCI-9 and PCI-10 wherein each are associated to groupId=1, PCI-5, PCI-6 and PCI-7 are handled as a set for the purpose There is also a maximum number of PCIs per group (denoted maxNrof-PCI-Per-Group in the example below), and a maximum number of configured groups (e.g., denoted maxNrofGroups).

```
********************************************************
MeasObjectNR ::=                    SEQUENCE {
  ssbFrequency                      ARFCN-ValueNR           OPTIONAL,
-- Cond SSBorAssociatedSSB
[ ... ]
  physCellIdGroups-ToAddModList          PhysCellIdGroups-ToAddModList
OPTIONAL, -- Need N
[ ... ]
}
PhysCellIdGroups-ToAddModList ::=      SEQUENCE (SIZE (1 .. maxNrofGroups)) OF
PhysCellIdGroups-ToAddMod
PhysCellIdGroups-ToAddMod ::=       SEQUENCE {
      groupId                                 INTEGER (0 ..
maxNrofGroups-1)
      physCellIdList                          SEQUENCE (SIZE
(1 .. maxNrof-PCI-Per-Group)) OF PhysCellId,
}
********************************************************
```

Another option could be to provide the groups of PCIs as a range (e.g., similar to the way white lists in 3GPP TS 38.331 are configured) i.e., instead of providing each PCI that forms a group (or set), the WD 22 provided with a Range of PCIs, possibly encoded in ASN.1 as follows:

```
********************************************************
MeasObjectNR ::=                    SEQUENCE {
  ssbFrequency                      ARFCN-ValueNR               OPTIONAL,
-- Cond SSBorAssociatedSSB
[ ... ]
  cells-PCI-ToAddModList            Cells-PCI-ToAddModList OPTIONAL, -- Need N
[ ... ]
}
Cells-PCI-ToAddModList ::=          SEQUENCE (SIZE (1 .. maxNrofCellMeas))
OF PCI-RangeElement
PCI-RangeElement ::=                SEQUENCE {
  pci-RangeIndex                    PCI-RangeIndex,
  pci-Range                         PCI-Range
}
PCI-RangeIndex ::=                  INTEGER (1..maxNrofPCI-Ranges)
********************************************************
```

A PCI can be associated to more than a group. This can be useful, for example, if there is a limit on the number of PCIs one can configure for L1/L2 centric mobility.

In the examples above, the cells and/or PCIs that form a group so the WD 22 treats them as a single cell, the configuration was provided within the measurement object.

However, other alternatives are not precluded e.g., within ReportConfigNR, MeasID, etc.

The method may also include the configuration of group-specific offsets. If applicable to solution 1, wherein multiple PCIs in the group are associated to a single neighbour cell, this can be interpreted as an extension of a cell-specific offset, wherein there can be different offsets per PCI of that neighbour cell. An example of a signaling is shown below, wherein for each PCI an offset configuration can be provided:

```
********************************************************
MeasObjectNR ::=                SEQUENCE {
  ssbFrequency                  ARFCN-ValueNR                   OPTIONAL,
-- Cond SSBorAssociatedSSB
[ ... ]
  cells-PCI-ToAddModList            Cells-PCI-ToAddModList OPTIONAL, -- Need N
[ ... ]
}
cells-PCI-ToAddModList ::=          SEQUENCE (SIZE (1 .. maxNrofCellMeas))
OF Cells-PCI-ToAddMod
Cells-PCI-ToAddMod::=            SEQUENCE {
  physCellId                    PhysCellId,
      groupId                                 INTEGER (0 .. max-
PCI-groups)
      cellIndividualOffset          Q-OffsetRangeList
}
[ ... ]
Q-OffsetRangeList ::=           SEQUENCE {
  rsrpOffsetSSB                 Q-OffsetRange                   DEFAULT dB0,
  rsrqOffsetSSB                 Q-OffsetRange                   DEFAULT dB0,
  sinrOffsetSSB                 Q-OffsetRange                   DEFAULT dB0,
  rsrpOffsetCSI-RS                  Q-OffsetRange                   DEFAULT dB0,
```

-continued

| rsrqOffsetCSI-RS | Q-OffsetRange | DEFAULT dB0, |
| sinrOffsetCSI-RS | Q-OffsetRange | DEFAULT dB0 |
| } | | |

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

If applicable to solution 2, wherein multiple PCIs in the group are associated to multiple neighbour cells forming that group, this can still be interpreted as cell-specific offsets, with the exception that these are handled together as a group.

Performing Measurements and Event Triggering Evaluation

In one embodiment, the WD 22 performs measurements per group based on the multiple PCIs of each group/set/pool/sequence/list.

indicated by the network of a single PCI of the group for deriving cell measurements to be used as input to event triggering evaluation. That indicated PCI may be indicated per group in the measurement configuration (e.g., as part of the measurement object). An example is shown below where a flag indicates if a configured PCI for a group is the one to be considered as the indicated PCI for CQD for event triggering evaluation:

```
**************************************************************************
MeasObjectNR ::=                  SEQUENCE {
  ssbFrequency                    ARFCN-ValueNR              OPTIONAL,
-- Cond SSBorAssociatedSSB
[ ... ]
  cells-PCI-ToAddModList                  Cells-PCI-ToAddModList OPTIONAL, -- Need N
[ ... ]
}
cells-PCI-ToAddModList ::=               SEQUENCE (SIZE (1 .. maxNrofCellMeas)) OF Cells-
PCI-ToAddMod
Cells-PCI-ToAddMod::=             SEQUENCE {
  physCellId                      PhysCellId,
      groupId                                    INTEGER (0 .. max-
PCI-groups)
      mainPhysCellId                             ENUMERATED {true}
}
**************************************************************************
```

If applicable to solution 1, one can call a measurement per group as a measurement per cell, wherein CQD is performed considering SSBs and/or CSI-RS associated to multiple PCIs, wherein these multiple PCIs are associated to the same cell.

If applicable to solution 2, one can call a measurement per group as a measurement per "equivalent cell" or per "cell group" or per "cell set" or "combined cell", wherein a CQD is in fact some kind of "combined cell" quality derivation, wherein this "combined cell" quality derivation is performed considering SSBs and/or CSI-RS associated to multiple PCIs, wherein each of these PCIs are associated to a cell forming a group.

Fundamentally for both solutions 1 and 2, multiple PCIs are considered as a group when the WD 22 performs a CQD. Hence, the following covers both cases.

The CQD can be performed one or more of at least in the following ways:

Indicated PCI from the group used for event triggering evaluation;

PCI or PCIs from the group used for event triggering evaluation selected based on rule(s); and PCIs from the group are combined and used for event triggering evaluation.

Indicated PCI from the Group used for Event Triggering Evaluation

In one embodiment, even though multiple PCIs of a neighbour frequency form a group (and WD 22 may be configured with multiple groups of PCIs), the WD 22 is For example, WD 22 may be configured by a network node with a group (whose group ID=3) formed by PCI-5, PCI-6 and PCI-7, wherein PCI-6 is the indicated PCI for deriving cell measurements (cell RSRP, cell RSRQ, cell SINR). In that case, WD 22 performs CQD based on PCI-6 and uses it as input to event triggering evaluation for a given group. That assumes some kind of overlapping coverage for a neighbour where the multiple PCIs in the group always overlap with the indicated PCI i.e., it is the coverage of the indicated PCI that matters for event triggering evaluation for determining measurement reports to be transmitted or not.

In another embodiment, even though a single PCI of the group is indicated to be used by the WD 22 for performing CQD (e.g., for cell RSRP to be used as the neighbour measurements on event evaluation), the WD 22 also performs CQD for each of the other PCI(s), though they are not used as input to event triggering evaluations. Hence, the WD 22 performs e.g., RSRP for PCI-6, PCI-5, and PCI-7, but only uses the RSRP for PCI-6 for event triggering evaluation. In one option, the measurement for the other PCIs (i.e., PCI-5 and PCI-7) can be performed according to the configuration of reporting quantities (not trigger quantity).

In another embodiment these measurement for the PCIs not indicated but belonging to the group are performed if configured by the network. For example, the network (e.g., NN 16) may have an optional configuration indicating that measurements on PCIs per group, in addition to the indicated PCI, are to be performed.

One example is shown below of how that can be implemented in different specifications for the case Solution 1 is adopted (i.e., one neighbour cell has multiple PCIs), where for simplicity mainly SSB measurements are considered.

In RRC_CONNECTED, the WD 22 measures multiple beams (at least one) of a cell and the measurements results (power values) are averaged to derive the cell quality. In doing so, the WD 22 is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the WD 22 is configured to do so by the network node 16 (e.g., gNB).

ment quantity indicated in reportQuantityRS-Indexes, as described in 5.5.3.3a;

6> derive cell measurement results based on SS/PBCH block for the trigger quantity and each measurement quantity indicated in reportQuantityCell using parameters from the associated meas Object, as described in 5.5.3.3;

Example of Changes to TS 38.215 to support Some Embodiments are provided below:

5.1.1 SS reference signal received power (SS-RSRP)

| Definition | [...] |
| --- | --- |
| | SS-RSRP may be measured only among the reference signals corresponding to SS/PBCH blocks with the same SS/PBCH block index and the same physical-layer cell identity. If multiple physical-layer cell identities are associated to a cell for neighbour cell measurements, the SS-RSRP may be measured only among the reference signals corresponding to SS/PBCH blocks with the same SS/PBCH block index and the indicated physical-layer cell identity for that neighbour cell (indicated via RRC signalling). If SS-RSRP is not used for L1-RSRP and higher-layers indicate certain SS/PBCH blocks for performing SS-RSRP measurements, then SS-RSRP is measured only from the indicated set of SS/PBCH block(s). For frequency range 1, the reference point for the SS-RSRP may be the antenna connector of the WD 22. For frequency range 2, SS-RSRP may be measured based on the combined signal from antenna elements corresponding to a given receiver branch. For frequency range 1 and 2, if receiver diversity is in use by the WD 22, the reported SS-RSRP value may not be lower than the corresponding SS-RSRP of any of the individual receiver branches. |
| Applicable for | If SS-RSRP is used for L1-RSRP, RRC_CONNECTED intra-frequency. Otherwise, RRC_IDLE intra-frequency, RRC_IDLE inter-frequency, RRC_INACTIVE intra-frequency, RRC_INACTIVE inter-frequency, RRC_CONNECTED intra-frequency, RRC_CONNECTED inter-frequency |

If the WD 22 is configured to perform neighbour measurements with multiple PCIs per cell, the WD 22 measures multiple beams (at least one) of a cell associated to multiple PCIs and the measurements results (power values) are averaged to derive the cell quality.

Figure 13:
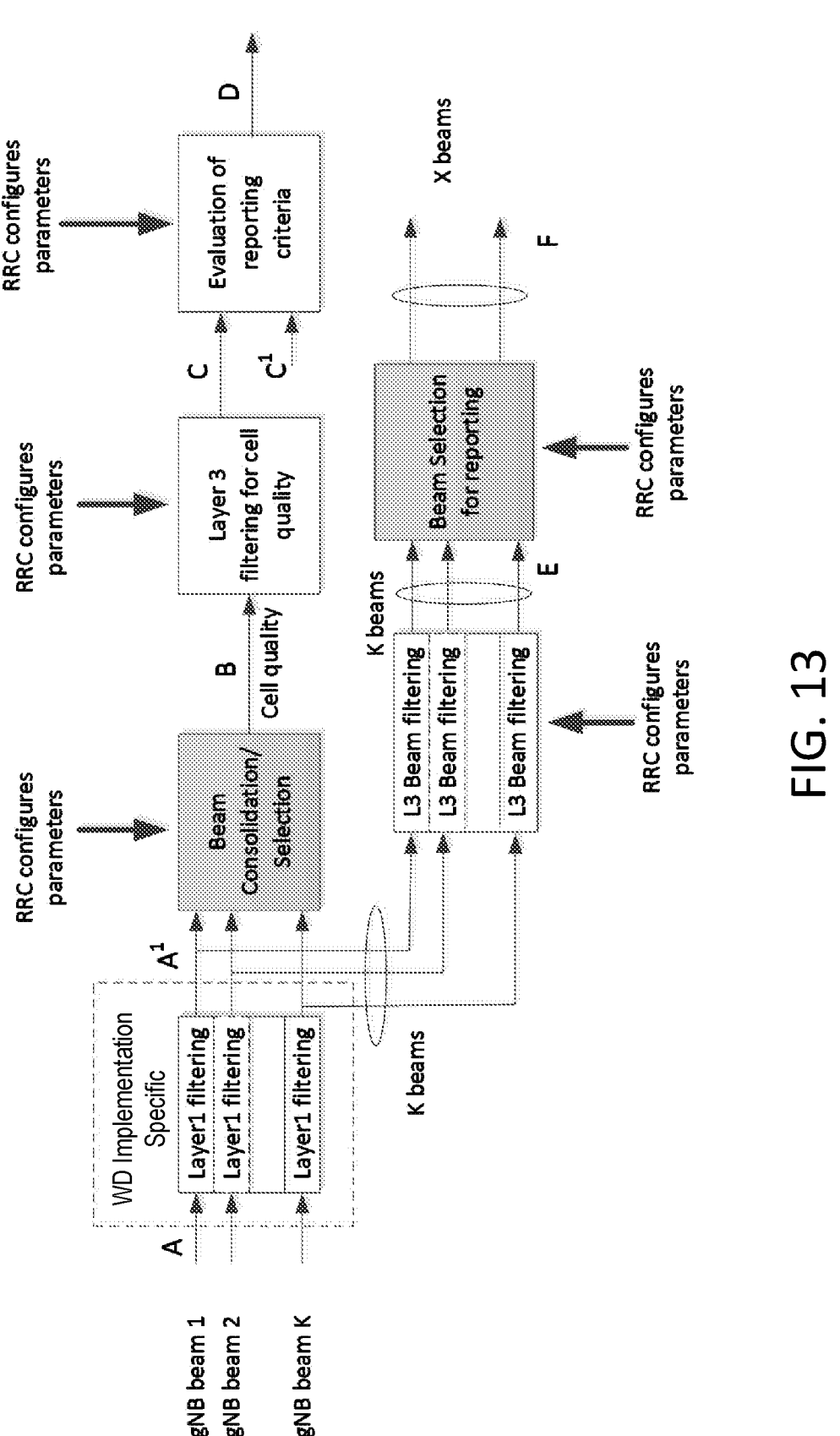
FIGS. 13-14 are schematic diagrams of a measurement model according to some embodiments of the present disclosure.

An example of a corresponding high-level measurement model is illustrated in FIG. 13. An example of changes to 3GPP TS 38.331 to support some embodiments of the present disclosure is shown below.

5.5.3 Performing Measurements
5.5.3.1 General
The WD 22 may:
  1> for each measId included in the measIdList within VarMeasConfig:
    [ . . . ]
  2> if the reportType for the associated reportConfig is periodical, eventTriggered or condTriggerConfig:
    3> if a measurement gap configuration is setup, or
    3> if the WD 22 does not require measurement gaps to perform the concerned measurements:
      [ . . . ]
      5> if the measObject is associated to NR and the rsType is set to ssb:
        6> if reportQuantityRS-Indexes and maxNrofRS-IndexesToReport for the associated reportConfig are configured:
          7> derive layer 3 beam measurements only based on SS/PBCH block for each measure- Another example is shown below of how that can be implemented in different specifications for the case Solution 2 is adopted (i.e., one neighbour cell has multiple PCIs), where for simplicity mainly SSB measurements are considered.

If the WD 22 is configured to perform neighbour measurements for a combined cell (i.e., SSBs with different PCIs representing multiple cells forming a combined cell), the WD 22 measures multiple beams of multiple cells and the measurements results (power values) are averaged to derive the cell quality.

Figure 14:
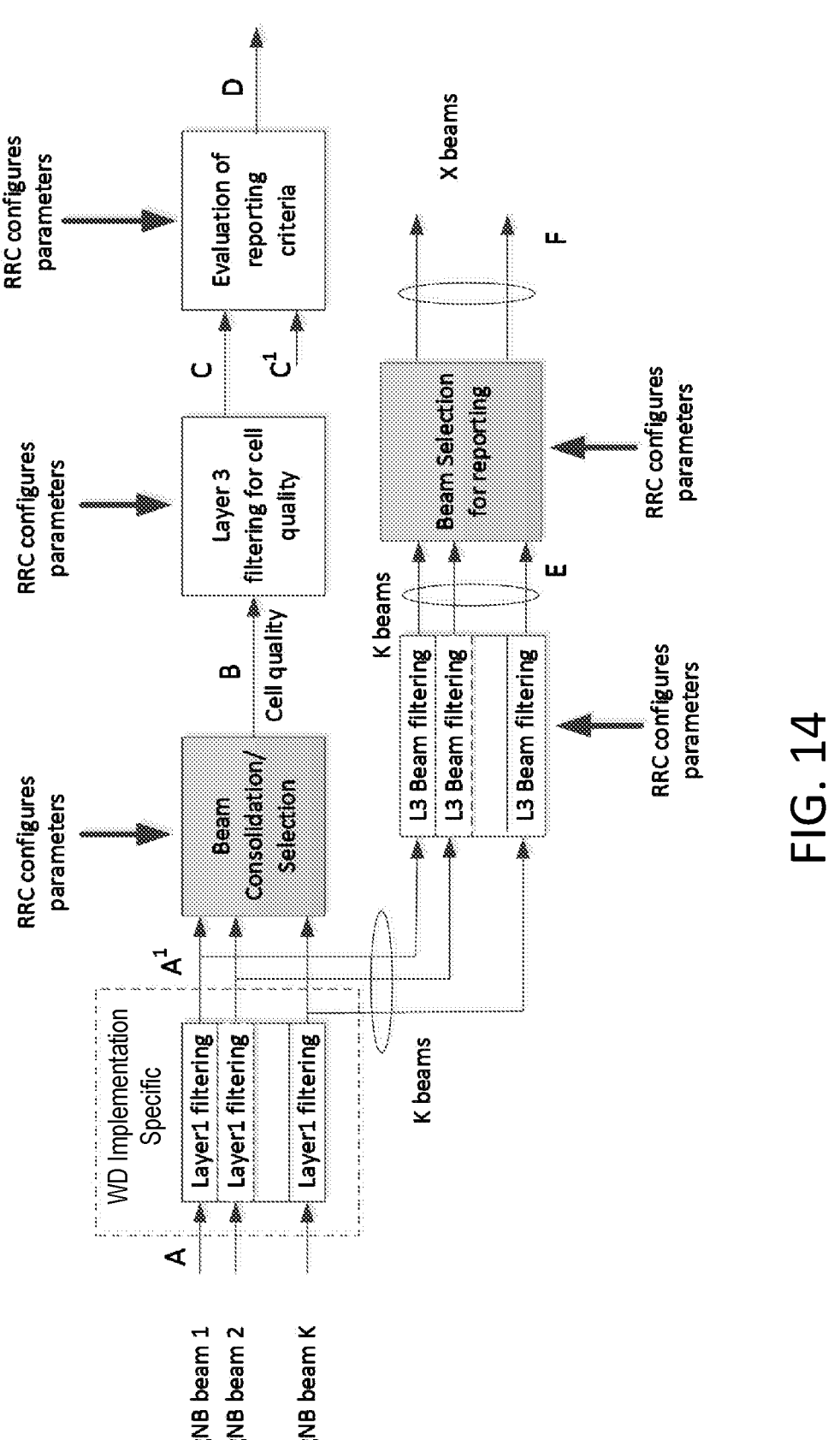

The corresponding high-level measurement model are illustrated in FIG. 14. An example of changes to TS 38.331 to support some embodiments is shown below.

5.5.3 Performing Measurements
5.5.3.1 General
The WD 22 may:
  1> for each measId included in the measIdList within VarMeasConfig:
    [ . . . ]
  2> if the reportType for the associated reportConfig is periodical, eventTriggered or condTriggerConfig:
    3> if a measurement gap configuration is setup, or
    3> if the WD 22 does not require measurement gaps to perform the concerned measurements:
      4> if s-MeasureConfig is not configured, or
      4> if s-MeasureConfig is set to ssb-RSRP and the NR SpCell RSRP based on SS/PBCH block, after layer 3 filtering, is lower than ssb-RSRP, or 4> if s-MeasureConfig is set to csi-RSRP and the NR SpCell RSRP based on CSI-RS, after layer 3 filtering, is lower than csi-RSRP:

[ . . . ]

5> if the measObject is associated to NR and the rsType is set to ssb:

6> if reportQuantityRS-Indexes and maxNrofRS-IndexesToReport for the associated reportConfig are configured:

7> derive layer 3 beam measurements only based on SS/PBCH block for each measurement quantity indicated in report QuantityRS-Indexes, as described in 5.5.3.3a;

6> derive cell measurement results based on SS/PBCH block for the trigger quantity and each measurement quantity indicated in reportQuantityCell using parameters from the associated meas Object, as described in 5.5.3.3;

Example of Changes to TS 38.215 to support Some Embodiments is provided below:

5.1.1 SS Reference Signal Received Power (SS-RSRP)

| | |
|---|---|
| Definition | [...] |
| | SS-RSRP may be measured only among the reference signals corresponding to SS/PBCH blocks with the same SS/PBCH block index and the same physical-layer cell identity. If WD 22 is configured to perform neighbour measurements on a combined cell (i.e., multiple cells wherein the WD 22 could perform L1/L2-centric mobility), the SS-RSRP may be measured only among the reference signals corresponding to SS/PBCH blocks with the same SS/PBCH block index and the indicated physical-layer cell identity for the main neighbour cell (indicated via RRC signalling). |
| | [...] |
| Applicable for | If SS-RSRP is used for L1-RSRP, |
| | RRC_CONNECTED intra-frequency. |
| | Otherwise, |
| | RRC_IDLE intra-frequency, |
| | RRC_IDLE inter-frequency, |
| | RRC_INACTIVE intra-frequency, |
| | RRC_INACTIVE inter-frequency, |
| | RRC_CONNECTED intra-frequency, |
| | RRC_CONNECTED inter-frequency |

In another embodiment, when a neighbour is associated to multiple PCIs, the WD 22 considers all other PCIs in the group as blacklisted cells (as defined in TS 38.331, these PCIs would be like non-applicable cells). E.g., the WD 22 may detect these PCIs (and possibly measure these PCIs, e.g., according to the previous embodiments) but they are not considered as applicable cells in the sense they are not used as input for event triggering evaluations.

In the present disclosure when it is stated a "PCI(s)", both solutions for L1/L2-centric inter-cell mobility can be considered:

If solution 1) a single PCI is indicted as representative for the group, so WD 22 perform CQD based on it, and use that as input to event triggering evaluations.

If solution 2) an indicated cell (out of the multiple configured cells in a group) is indicted as representative cell for the group, so WD 22 perform CQD based on it, and use that as input to event triggering evaluations.

The outcome of the method described above may be a single value for a given measurement quantity (e.g., an RSRP as trigger quantity). If solution 1 is adopted, that is a neighbour cell RSRP (computed based on multiple PCIs). If solution 2 is adopted, that is a neighbour "equivalent cell RSRP" (computed based on multiple cells).

Hence, if solution 1, event evaluation based on neighbour cell measurement (e.g., neighbour cell RSRP) can remain as in legacy based on a single value, except for the way the WD 22 performs CQD, which is according to the method i.e., based on multiple PCIs.

If solution 2, event evaluation based on a neighbour cell measurement (e.g., neighbour cell RSRP) is modified and considers an equivalent cell measurement performed according to the method e.g., an equivalent cell quality is a measurement combining measurement from multiple cells associated to a group.

PCI or PCIs from the Group Used for Event Triggering Evaluation Selected Based on Rule(s)

In one embodiment, even though multiple PCIs of a neighbour frequency form a group (and WD 22 may be configured with multiple groups of PCIs), the WD 22 performs CQD for all (or a subset) of the configured PCIs of the group i.e., the WD 22 derives cell measurements per PCI, as if these would be independent cells.

An advantage of this method is that measurements are still performed per PCI in the same way as in legacy they are performed per cell, the difference being in the way event triggering evaluation is handled.

The CQD method proposed herein may impact the event definition in at least one of the following ways:

A3 event (Neighbour becomes offset better than SpCell)

In one example, the WD 22 selects the strongest measurement per PCI for representing the neighbour cell in the A3 event evaluation, where multiple PCIs are configured for a neighbour cell. For example, if that selected neighbor cell (based on the selected strongest PCI in the group) measurement becomes offset (+hysteresis) better than the serving cell measurement, then the WD 22 considers the A3 event entering condition to be met. This can be an option for e.g., solution 1.

In one example (if solution 2 is adopted) the WD 22 selects the strongest cell measurement (e.g., highest cell RSRP) for representing the configured group of neighbour cells in the A3 event evaluation, where multiple neighbour cells are configured as a group. For example, if that selected neighbor cell measurement becomes offset (+hysteresis) better than the serving cell measurement, then the WD 22 considers the A3 event entering condition to be met.

In one example, the WD 22 selects the weakest measurement per PCI for representing the neighbour cell in the A3 event evaluation, where multiple PCIs are configured for a neighbour cell. E.g., if that selected neighbor cell (based on the selected weakest PCI in the group)

measurement becomes offset (+hysteresis) better than the serving cell measurement, then the WD 22 considers the A3 event entering condition to be met. This can be an option for e.g., solution 1.

In one example (if solution 2 is adopted) the WD 22 selects the weakest cell measurement (e.g., weakest cell RSRP) for representing the configured group of neighbour cells in the A3 event evaluation, where multiple neighbour cells are configured as a group. For example, if that selected neighbor cell measurement becomes offset (+hysteresis) better than the serving cell measurement, then the WD 22 considers the A3 event entering condition to be met.

A4 event (Neighbour becomes better than threshold)

The WD 22 considers the A4 event entering condition to be fulfilled (for a given group of PCIs) if at least one of the PCI measurements satisfies the event entering condition.

If solution 1 is adopted, the WD 22 considers the A4 event entering condition to be fulfilled for a given neighbour cell for which a group of PCIs is configured, if at least one of the measurements (per PCI for that group) satisfies the event entering condition.

If solution 2 is adopted, the WD 22 considers the A4 event entering condition to be fulfilled for a given neighbour cell group, for which a group of cells is configured, if at least one of the cell measurements (of that group) satisfies the event entering condition.

The WD 22 considers the A4 event entering condition to be fulfilled if the strongest of the neighbour measurements (for a given group of PCIs) satisfies the event entering condition.

If solution 1 is adopted, the WD 22 considers the A4 event entering condition to be fulfilled for a given neighbour cell for which a group of PCIs is configured, if the strongest measurement (per PCI for that group) satisfies the event entering condition.

If solution 2 is adopted, the WD 22 considers the A4 event entering condition to be fulfilled for a given neighbour cell group, for which a group of cells is configured, if the strongest cell measurement (of that group) satisfies the event entering condition.

The WD 22 considers the A4 event entering condition to be fulfilled if the weakest of the neighbour measurements satisfies the event entering condition.

If solution 1 is adopted, the WD 22 considers the A4 event entering condition to be fulfilled for a given neighbour cell for which a group of PCIs is configured, if the weakest measurement (per PCI for that group) satisfies the event entering condition.

If solution 2 is adopted, the WD 22 considers the A4 event entering condition to be fulfilled for a given neighbour cell group, for which a group of cells is configured, if the weakest cell measurement (of that group) satisfies the event entering condition.

The WD 22 considers the A4 event leaving condition to be fulfilled for a given group if the measurements for all PCIs of that group satisfies the event leaving condition.

If solution 1 is adopted, the WD 22 considers the A4 event entering condition to be fulfilled for a given neighbour cell for which a group of PCIs is configured, if all measurements (per PCI for that group) satisfies the event entering condition.

If solution 2 is adopted, the WD 22 considers the A4 event entering condition to be fulfilled for a given neighbour cell group, for which a group of cells is configured, if all cell measurements (of that group) satisfies the event entering condition.

The WD 22 considers the A4 event leaving condition to be fulfilled if the strongest of neighbour measurements (out of the measurements per PCI) for a given group satisfies the event leaving condition.

The WD 22 considers the A4 event leaving condition to be fulfilled if the weakest of neighbour measurements (out of the measurements per PCI) for a given group satisfies the event leaving condition.

A5 event (SpCell becomes worse than threshold1 and neighbour becomes better than threshold2)

Similar handling for neighbour measurements as in "A4 event (Neighbour becomes better than threshold)" shown above can be adopted herein for the second condition of A5 event (based on threshold2).

A6 event (Neighbour becomes offset better than SCell)

Similar handling for neighbour measurements as in "A3 event (Neighbour becomes offset better than SpCell)" shown above can be adopted herein except that herein the comparison is made with an SCell (not as SpCell as in the A3 event).

B2 event (PCell becomes worse than threshold1 and inter RAT neighbor becomes better than threshold2)

Similar handling for neighbour measurements as in "A4 event (Neighbour becomes better than threshold)" shown above can be adopted herein for the second condition of B2 event (based on threshold2).

According to the method, as there is some selection process where the WD 22 selects a measurement per PCI (if solution 1) or per cell (if solution 2) to be representative of a group, the WD 22 perform measurements on the configured PCI/cells for a configured group, wherein there can be multiple groups.

PCIs from the Group are Combined and Used for Event Triggering Evaluation

In some embodiments, different PCI(s) are associated to a group the WD 22 is configured with, associated to a neighbour frequency (e.g., configured in a MO associated to that neighbour frequency) are combined (or jointly consolidated) when the WD 22 performs neighbour measurements associated to that neighbour frequency (e.g., indicated in the measurement object).

In other words, SSBs associated to the different PCIs can be combined or consolidated to compute neighbour measurements (e.g., neighbour cell RSRP/RSRQ/SINR). For example, neighbour cell quality of a cell associated to PCI-1 and PCI-2 can be the highest beam quality (e.g., highest SS-RSRP) among the set of beams (e.g., SSBs) associated to both PCI-1 and PCI-2 (or, the WD 22 can average beam qualities, like SS-RSRPs, associated to SSBs from multiple PCIs).

These embodiments are equally applicable for inter-PCUinter-cell multi-TRP, in addition to the case of L1/L2-centric inter-cell mobility; the difference would be that the WD 22 is connected to multiple TRPs simultaneously.

Figure 15:
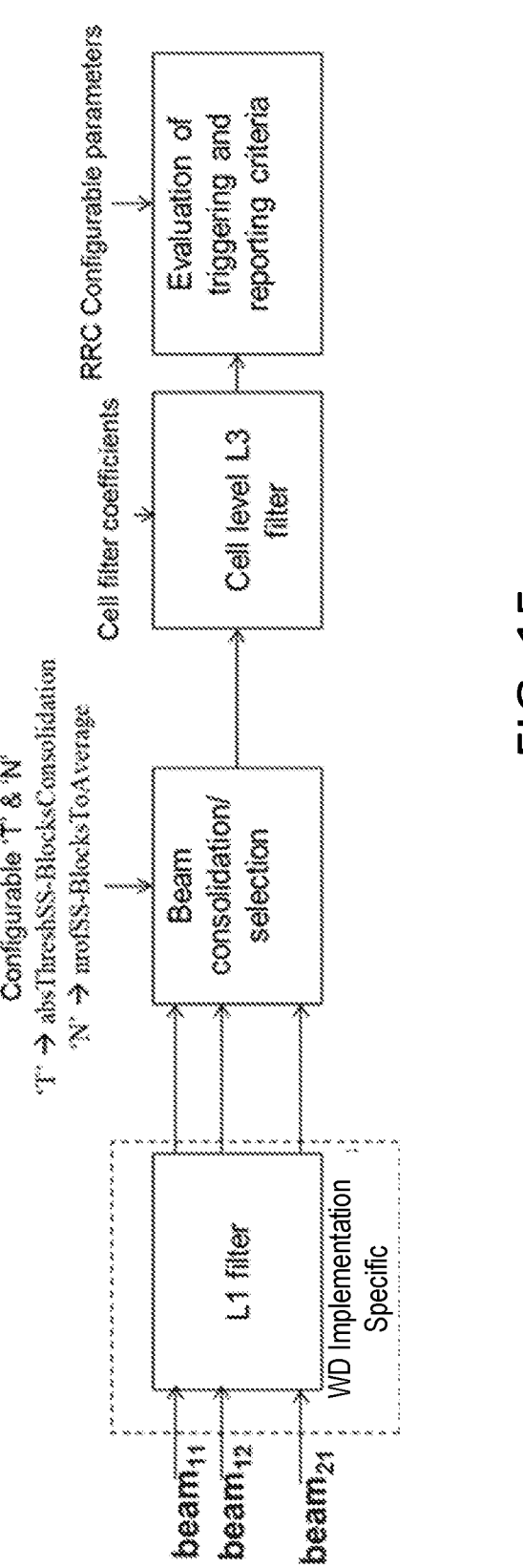
FIGS. 15-17 are schematic diagrams of a beam consolidation according to some embodiments of the present disclosure.

In one alternative the WD 22 performs the CQD of a neighbour (e.g., a neighbour cell measurement based on multiple PCIs, or a quality of a group or combined cell) based on the following:

L1 level beam (e.g., SSB) consolidation belonging to multiple PCIs—In this method, the beams (e.g., SSBs) associated to the configured PCIs (all or an indicated subset) are combined into a measurement like cell RSRP, cell RSRQ or cell SINR, as illustrated in FIG. 15 for example.

After the WD 22 obtains L1 beam measurements (e.g., SSB measurements for the one or multiple PCIs associated with a neighbour cell) the WD 22 applies a beam consolidation/selection function.

In one embodiment, for a neighbour cell, the WD 22 derives a cell measurement quantity (e.g., RSRP, RSRQ, SINR) based on SS/PBCH block (SSB) as the highest beam measurement quantity value (out of the beam measurement quantity values from all multiple configured PCIs), where each beam measurement quantity is described in TS 38.215.

In some embodiments, for a neighbour cell, the WD 22 is configured with parameters for the beam consolidation/selection function. The parameters for that function are configuration by the network e.g., in measConfig, as part of the measurement object configuration associated to that neighbour frequency the WD 22 performs measurements for.

In another embodiment, for a neighbour cell, the WD 22 derives the neighbour cell measurement quantity (e.g. cell RSRP, cell RSRQ, cell SINR) based on SS/PBCH blocks of the multiple PCIs associated to that neighbour cell (configured as a group of PCIs e.g., in the measurement object) as the linear power scale average of the highest beam measurement quantity values where the total number of averaged beams may not exceed N. Further conditions may be applicable for the embodiment to be applied. In another variant, instead of a linear power scale average, a weighted average is used, where measurement associated to different PCIs may have different weights.

One advantage of this variant is that the WD 22 derives neighbour cell quality using beams from multiple PCIs as configured by the network (as these are associated with that cell), producing a fair measurement to be compared with a serving cell measurement. Another advantage is the lower complexity at the WD 22 implementation, where some of the processes defined after L1 filter may remain similar to what is done in legacy. For example, beam consolidation receives a set of beam measurements from the L1 filter as input, but according to the method these are associated to different PCIs.

If applied to Solution 2), the handling of PCIs described above remain similar except that the WD 22 derives a quality value per group of cells, using the multiple PCIs. In other words, it could be argued that this is describing an equivalent cell quality derivation or a cell group quality derivation. In other words, if applicable to solution 2, one can call a measurement per group as a measurement per "equivalent cell" or per "cell group" or per "cell set" or "combined cell", wherein a cell quality derivation is in fact some kind of "combined cell" quality derivation, wherein this "combined cell" quality derivation is performed considering SSBs and/or CSI-RS associated to multiple PCIs, wherein each of these PCIs are associated to a cell forming a group.

If applied to Solution 2), in some examples, different cells with their associated PCI(s) are associated to a group the WD 22 is configured with, associated to a neighbour frequency (e.g., configured in a measurement object associated to that neighbour frequency) are combined (or jointly consolidated) when the WD 22 performs neighbour measurements associated to that neighbour frequency (e.g., indicated in the measurement object).

If applied to Solution 2), SSBs associated to different cells (each cell associated to a PCI) can be combined or consolidated to compute neighbour measurements (e.g., neighbour cell RSRP, neighbour cell RSRQ, neighbour cell SINR). For example, neighbour cell quality of a cell associated to PCI-1 and PCI-2 can be the highest beam quality (e.g., highest SS-RSRP) among the set of beams (e.g., SSBs) associated to both PCI-1 and PCI-2 (or, the WD 22 can average beam qualities, like SS-RSRPs, associated to SSBs from multiple PCIs).

If applied to Solution 2), these embodiments are equally applicable for inter-PCI/inter-cell multi-TRP, in addition to the case of L1/L2-centric inter-cell mobility; the difference would be that the WD 22 is connected to multiple TRPs simultaneously.

In one alternative, if applied to Solution 2), the WD 22 performs an "equivalent cell" quality derivation of a neighbour (e.g., a neighbour measurement is a combination of measurements from multiple cells of the configured group, each based on its PCI) based on the following:

L1 level beam (e.g., SSB) consolidation belonging to multiple cells (each having its PCI)

In this method, the beams (e.g., SSBs) associated to the configured cells of a group (all or an indicated subset) are combined into a measurement like equivalent cell RSRP, equivalent cell RSRQ or equivalent cell SINR.

L1 level beam (e.g., SSB) consolidation per cell associated to a group and further consolidation of cell quantities belonging to different cells of the same group—In this method, the beam level consolidation is performed for each of the configured cells of a group (wherein the group is configured e.g., in a measurement object) and then these cell level measurements are further consolidated to produce a single measurement quantity (e.g., an equivalent cell quality, like an equivalent cell RSRP, equivalent cell RSRQ) and this measurement quantity is filtered to produce the L3 measurements, as illustrated below. An advantage of this solution is that a single L3 filtering operation is required to perform an equivalent cell measurement.

L1 level beam (e.g., SSB) consolidation per cell to produce a cell level layer-3 filtered measurement quantity (for a given group of configured cells for measurements) and then these PCI specific measurements are consolidated to produce a single measurement quantity i.e., an equivalent cell measurement. In this method, the beam level consolidation is performed for each of the cells associated to a group configured by the network for a neighbour frequency e.g., in a measurement object. Then, these cell level measurements are further consolidated to produce a single measurement quantity (equivalent cell measurement) and this measurement quantity is filtered to produce the L3 measurements. An advantage of this solution is that, there is no consolidation required to be performed at the SSB level and the currently existing cell level L3 measurements are combined to produce a single measurement quantity.

Figure 16:
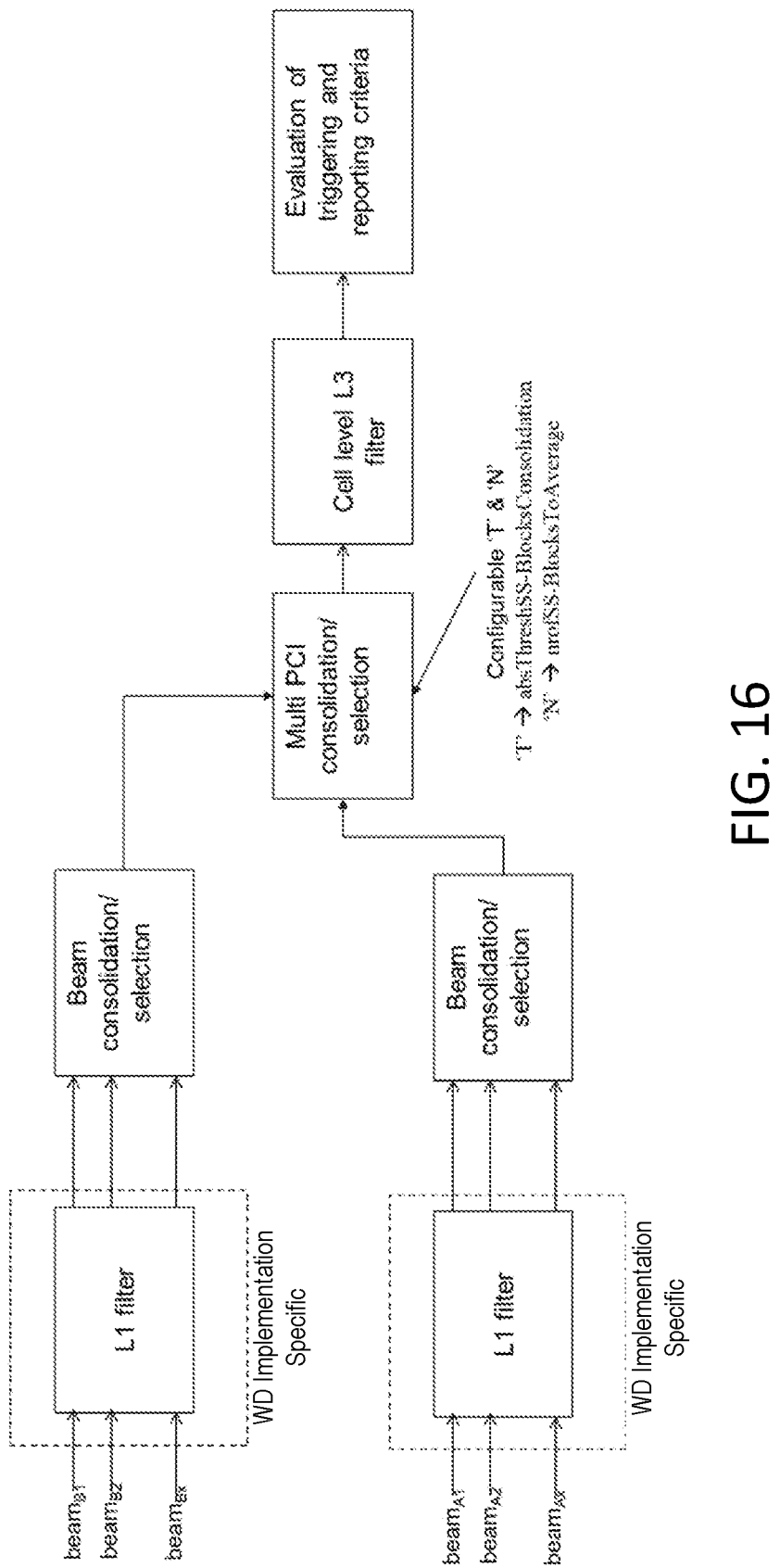

In another alternative the WD 22 performs the cell quality derivation of a neighbour (e.g., a neighbour cell measurement based on multiple PCIs, or a quality of a group or combined cell) based on the following:

L1 level beam (e.g., SSB) consolidation per PCI and further consolidation of cell quantities belonging to different PCIs—In this method, the beam (e.g., SSB) level consolidation is performed for each of the configured PCIs in a group (configured e.g., in a measurement object) and then these PCI level measurements are further consolidated to produce a single measurement quantity and this measurement quantity is filtered using network configured L3 filtering parameters to produce the L3 measurements, as illustrated below. An advantage of this solution is that there is no need to perform per PCI level L3 filtering, thus reducing the processing overhead at the WD 22 side. FIG. 16 illustrates an example.

Figure 17:
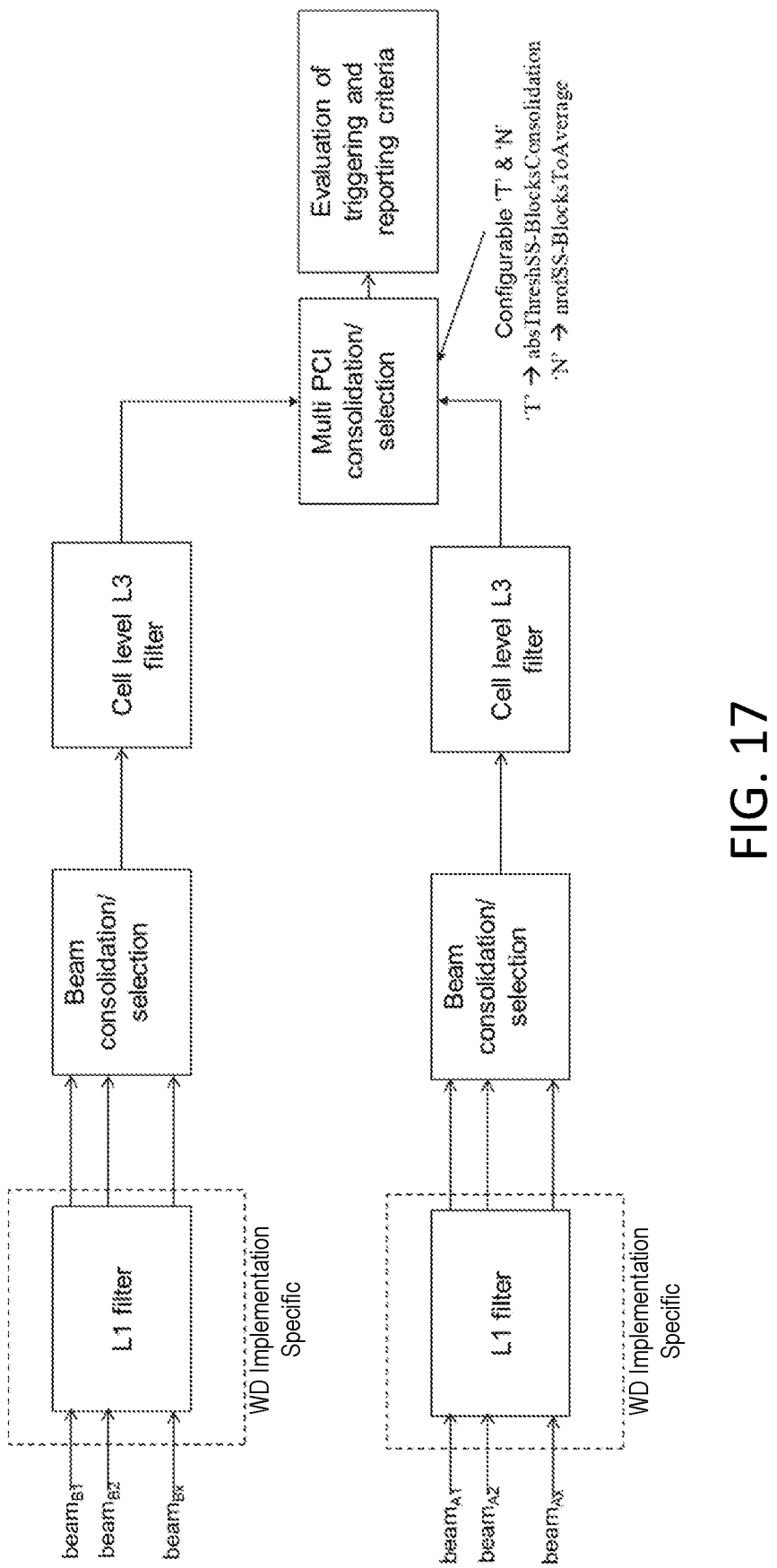

L1 level beam (e.g., SSB) consolidation per PCI to produce a PCI level layer-3 filtered measurement quantities and then these PCI specific measurements are consolidated to produce a single measurement quantity—In this method, the beam (e.g., SSB) level consolidation is performed for each of the PCIs associated to a group configured by the network for a neighbour frequency e.g., in a measurement object. The per PCI beam consolidated measurements are then passed through PCI specific layer 3 filtering operation and then, these layer-3 filtered PCI level measurements are further consolidated to produce a single measurement quantity. An advantage of this solution is that, there is no consolidation required to be performed at the SSB level and the currently existing PCI level L3 measurements are combined to produce a single measurement quantity. FIG. 17 illustrates an example.

In one embodiment, a single pair of parameters are used: N (e.g., nrofSS-BlocksToAverage) and T (absThreshSS-BlocksConsolidation) for cell quality derivation, where these can be configured in the measurement object. The same pair for all beam measurements for the different PCIs can be used. In that case, the WD 22 may derive the neighbour cell measurement quantity (e.g., cell RSRP, cell RSRQ, cell SINR) based on SS/PBCH blocks of the multiple PCIs associated to the group configured e.g., in the measurement object, as the linear power scale average of the highest beam measurement quantity values above 'T' where the total number of averaged beams may not exceed N. Further conditions may be applicable for the embodiment to be applied.

In another embodiment, if applicable to solution 2, a single pair of parameters is used: N (e.g., nrofSS-Blocks-ToAverage) and T (absThreshSS-BlocksConsolidation) for equivalent cell quality derivation, where these can be configured in the measurement object. The same pair for all beam measurements for the different cells within a group can be used. In that case, the WD 22 may derive the equivalent neighbour cell measurement quantity (e.g., cell RSRP, cell RSRQ, cell SINR) based on SS/PBCH blocks of the multiple cells associated to the group configured e.g., in the measurement object, as the linear power scale average of the highest beam measurement quantity values above 'T' where the total number of averaged beams may not exceed N. Further conditions may be applicable for the embodiment to be applied.

In one embodiment, the L3 filtering coefficients to be used to perform the neighbour cell measurements' filtering based on multiple PCIs can be differently configured compared to the other cell related measurements e.g., different filter coefficients for different PCIs, or a different value in case the filtering is applied a cell quality derived based on multiple PCIs.

In another embodiment, if that is applicable to Solution 2), the L3 filtering coefficients to be used to perform the equivalent neighbour cell measurements' filtering based on multiple cells can be differently configured compared to the other cell related measurements e.g., different filter coefficients for different cells, or a different value in case the filtering is applied an equivalent cell quality derived based on multiple cells.

In the combined method, the outcome is a single value. If solution 1, that is a neighbour cell RSRP (computed based on multiple PCIs). If solution 2, that is a neighbour "equivalent cell RSRP" (computed based on multiple cells).

Hence, if solution 1, event evaluation based on neighbour cell measurement (e.g., neighbour cell RSRP) can remain as in legacy based on a single value, except for the way the WD 22 performs CQD, which is according to the method i.e., based on multiple PCIs.

If solution 2, event evaluation based on a neighbour cell measurement (e.g., neighbour cell RSRP) is modified and considers an equivalent cell measurement performed according to the method e.g., an equivalent cell quality is a measurement combining measurement from multiple cells associated to a group.

In another embodiment, if a measurement report associated to an event for a group is triggered (e.g., measurements based on PCI-6 fulfil an entering condition for an event for a configured timer to trigger), the WD 22 includes in the report the measurements of the other PCIs associated to the same group. Using the previous example, where PCI-6 is the indicated PCI, if that triggers a measurement report the WD 22 includes the measurements for PCI-6 and in addition to PCI-5 and PCI-7. Each PCI for which measurements are included are also included in the measurement report e.g., if WD 22 includes RSRP for PCI-5, the PCI-5 is also included in the measurement report so the network (e.g., NN 16) identifies which PCI is associated to which measurement.

In another embodiment, measurements on non-indicated PCIs for a given group are included in a message to be transmitted to the network, for example, upon a failure wherein measurements available are included in the message, like in an RLF report or an MCG failure report, or an SCG failure report.

In one embodiment, the WD 22 perform beam measurements per PCI and can report beam measurements per PCI in a measurement report, for the PCIs associated to a group. For example, WD 22 can include: beam-1 with PCI-7 (e.g., SSB index 1 whose PCI associated in the SSB is PCI-7), beam-12 with PCI-7 (e.g., SSB index 12 whose PCI associated in the SSB is PCI-7), beam-2 with PCI-5 (e.g., SSB index 2 whose PCI associated in the SSB is PCI-5), wherein PCI-5 and PCI-7 form a group. Beam measurements can have L3 filtering associated with different configuration compared to the L3 filtering for cell quality.

In the example below, MeasResults IE is enhanced with a MeasResultListNR-L1Mobility which comprises a list of IEs MeasResultListNR, one for each PCI to be reported for a given group/set of PCIs of a neighbour, as described above. Each of these could be associated to a group ID, that may also be included in the measurement report. Then, for each PCI in the group the WD 22 includes beam measurement information, such as beam index (e.g., SSB index, and/or CSI-RS index) and/or associated beam measurements (e.g., SS-RSRP, SS-CSI-RS, as defined in TS 38.215). There may be further rules defined for beam selection for selecting the beams to be included in a measurement report for the case beams are associated to the PCI, that may not be the PCI that was used for cell quality derivation and/or as input to event triggering evaluation.

In the example below, MeasResults IE is enhanced with a MeasResultListNR-L1Mobility which comprises a list of IEs MeasResultListNR, one for each PCI to be reported for a given group/set of PCIs of a neighbour, as described above. Each of these could be associated to a group ID, that may also be included in the measurement report. Then, for each PCI in the group the WD 22 includes beam measurement information, such as beam index (e.g., SSB index, and/or CSI-RS index) and/or associated beam measurements (e.g., SS-RSRP, SS-CSI-RS, as defined in TS 38.215). There may be further rules defined for beam selection for selecting the beams to be included in a measurement report for the case beams are associated to the PCI, that may not be the PCI that was used for cell quality derivation and/or as input to event triggering evaluation.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although

```
MeasResults ::=                    SEQUENCE {
    measId                         MeasId,
    [...]
    measRightNeighCells            CHOICE {
        measResultListNR-L1Mobility      MeasResultListNR-L1Mobility
    [...]
    }                                              OPTIONAL,
    [...]
    }
MeasResultListNR-L1Mobility::=          SEQUENCE (SIZE (1..L)) OF MeasResultListNR
MeasResultListNR ::=                    SEQUENCE (SIZE (1..maxCellReport)) OF MeasResultNR
MeasResultNR ::=                   SEQUENCE {
    groupId                                         INTEGER (1..K)
    physCellId                     PhysCellId
OPTIONAL,
    measResult                     SEQUENCE {
        cellResults                SEQUENCE {
            resultsSSB-Cell              MeasQuantityResults
OPTIONAL,
            resultsCSI-RS-Cell           MeasQuantityResults
OPTIONAL
        },
        rsIndexResults             SEQUENCE{
            resultsSSB-Indexes           ResultsPerSSB-IndexList
OPTIONAL,
            resultsCSI-Indexes           ResultsPerCSI-RS-IndexList
OPTIONAL
        }                                              OPTIONAL
    },
    [..]
}
```

Other aspects related to reporting include one or more of the following:

Include a group ID in the measurement report;

Include a Measurement ID associated with a reportConfig and a measurement object.

As described above, the one or multiple sets of PCIs for a neighbour (serving or non-serving frequency) can be configured in the measurement object. However, the WD 22 can detect a PCI not in any of the groups, and operates as in legacy. In that case, including a group ID is a way to indicate that the measId is associated to a measurement report associated to one of the configured groups.

As will be appreciated by one of skill in the art, the concepts described herein may be embodied as a method, data processing system, computer program product and/or computer storage media storing an executable computer program.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, may be construed to constitute a complete written description of all combinations and subcombinations of the embodiments described herein, and of the manner and process of making and using them, and may support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, the method comprising:

receiving a measurement configuration to perform at least one neighbor cell measurement, the measurement configuration indicating a first group of physical cell identities, PCIs, the measurement configuration comprising a list of a plurality of PCIs and at least one PCI in the list associated with a first group identifier, ID, identifying the first group;

performing the at least one neighbor cell measurement based on the measurement configuration, for the first group of PCIs;

triggering an event based on the at least one neighbor cell measurement; and sending a report to the network node as a result of the event, the network node determining whether to configure the WD with Level One/Level Two, L1/L2, centric mobility or not based on the report.

2. The method of claim 1, wherein the measurement configuration comprises a list of groups including the first group and a first group identifier, ID, is associated with the first group.

3. The method of claim 1, wherein the measurement configuration indicates a range of PCIs that are comprised in the first group.

4. The method of claim 1, wherein the measurement configuration indicates at least one cell-specific offset for each PCI in the first group.

5. The method of claim 1, wherein the WD is configured to perform the at least one neighbor cell measurement based on the first group on a single neighbor cell, the single neighbor cell being associated with the measurement configuration and the first group of PCIs.

6. The method of claim 5, further comprising:

measuring a plurality of beams of the single neighbor cell associated with the first group of PCIs and one of: selecting one of the measurements to represent a cell quality for the first group and averaging the measurements to derive the cell quality of the first group.

7. The method of claim 6, wherein the measurement configuration further indicates a first PCI out of the first group of PCIs to trigger an event evaluation for the first group and the performance of the at least one neighbor cell measurement based on the first group comprises measuring only a reference signal associated with the indicated first PCI to derive a cell quality for the first group.

8. The method of claim 1, wherein performing the at least one neighbor cell measurement based on the first group on a plurality of neighbor cells, each neighbor cell in the plurality of neighbor cells being identified by a corresponding PCI in the first group of PCIs.

9. The method of claim 8, further comprising:

measuring a plurality of beams of the plurality of neighbor cells associated with the first group of PCIs and one of: selecting one of the measurements to represent a cell quality of the first group and averaging the measurements to derive the cell quality of the first group.

10. The method of claim 8, wherein the measurement configuration further indicates a first PCI out of the first group of PCIs to trigger an event evaluation for the first group and the performance of the at least one neighbor cell measurement for the first group comprises measuring only a reference signal associated with the indicated first PCI to derive a cell quality for the first group.

11. The method of claim 1, wherein the triggered event is a measurement reporting and the method further comprises, responsive to the triggered event, sending measurement results comprising a plurality of measurement results associated with the first group of PCIs and a first group identifier, ID.

12. A method implemented in a network node configured to communicate with a wireless device, WD, the method comprising:

transmitting a measurement configuration to the WD to perform at least one neighbor cell measurement, the measurement configuration indicating a first group of physical cell identities, PCIs, the measurement configuration comprising a list of a plurality of PCIs and at least one PCI in the list associated with a first group identifier, ID, identifying the first group;

receiving a report from the WD, as a result of an event that is triggered based on the at least one neighbor cell measurement for the first group of PCIs; and determining whether to configure the WD with Level One/Level Two, L1/L2, centric mobility or not based on the report.

13. The method of claim 12, wherein the measurement configuration comprises a list of groups including the first group and a first group identifier, ID, is associated with the first group.

14. The method of claim 12, wherein the measurement configuration indicates a range of PCIs that are comprised in the first group.

15. The method of claim 12, wherein the measurement configuration indicates at least one cell-specific offset for each PCI in the first group.

16. The method of claim 12, wherein the measurement configuration indicates to the WD to perform the at least one neighbor cell measurement based on the first group on a single neighbor cell, the single neighbor cell being associated with the measurement configuration and the first group of PCIs.

17. The method of claim 16, wherein the at least one neighbor cell measurement comprises measurements performed on a plurality of beams in the single neighbor cell that is associated with the first group of PCIs and the report is based on one of: a selection of one of the measurements to represent a cell quality of the first group and an average of the measurements to derive the cell quality of the first group.

18. The method of claim 17, wherein the measurement configuration further indicates a first PCI out of the first group of PCIs to trigger an event evaluation for the first group and the performance of the at least one neighbor cell measurement for the first group comprises measuring only a reference signal associated with the indicated first PCI to derive a cell quality for the first group.

19. The method of claim 12, wherein the measurement configuration indicates to the WD to perform the at least one neighbor cell measurement for the first group on a plurality of neighbor cells, each neighbor cell in the plurality of neighbor cells being identified by a corresponding PCI in the first group of PCIs.

20. The method of claim 19, wherein the at least one neighbor cell measurement comprises measurements performed on a plurality of beams in the plurality of neighbor cells and the report is based on one of: a selection of one of the measurements to represent a cell quality of the first group and an average of the measurements to derive the cell quality of the first group.

21. The method of claim 19, wherein the measurement configuration further indicates a first PCI out of the first group of PCIs to trigger an event evaluation for the first group and the performance of the at least one neighbor cell measurement for the first group comprises measuring only a reference signal associated with the indicated first PCI to derive a cell quality for the first group.

22. The method of claim 12, wherein the triggered event is a measurement reporting and the method further comprises, as a result of the triggered event, receiving measurement results comprising a plurality of measurement results associated with the first group of PCIs and a first group identifier, ID.

23. A wireless device, WD, configured to communicate with a network node, the WD comprising processing circuitry, the processing circuitry configured to cause the WD to:

receive a measurement configuration to perform at least one neighbor cell measurement, the measurement configuration indicating a first group of physical cell identities, PCIs, the measurement configuration comprising a list of a plurality of PCIs and at least one PCI in the list associated with a first group identifier, ID, identifying the first group;

perform the at least one neighbor cell measurement based on the measurement configuration, for the first group of PCIs;

trigger an event based on the at least one neighbor cell measurement; and send a report to the network node as a result of the event, the network node determining whether to configure the WD with Level One/Level Two, L1/L2, centric mobility or not based on the report.

24. A network node configured to communicate with a wireless device, WD, the network node comprising processing circuitry, the processing circuitry configured to:

cause transmission of a measurement configuration to the WD to perform at least one neighbor cell measurement, the measurement configuration indicating a first group of physical cell identities, PCIs, the measurement configuration comprising a list of a plurality of PCIs and at least one PCI in the list associated with a first group identifier, ID, identifying the first group;

receive a report from the WD, as a result of an event that is triggered based on the at least one neighbor cell measurement for the first group of PCIs; and determine whether to configure the WD with Level One/ Level Two, L1/L2, centric mobility or not based on the report.

* * * * *